US 11,221,963 B2

(12) United States Patent
Campbell et al.

(10) Patent No.: US 11,221,963 B2
(45) Date of Patent: *Jan. 11, 2022

(54) METHODS AND SYSTEMS FOR INCORPORATING NON-TREE BASED ADDRESS TRANSLATION INTO A HIERARCHICAL TRANSLATION LOOKASIDE BUFFER (TLB)

(71) Applicant: International Business Machines Corporation, Armonk, NY (US)

(72) Inventors: David Campbell, Austin, TX (US); Dwain A. Hicks, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/773,175

(22) Filed: Jan. 27, 2020

(65) Prior Publication Data

US 2020/0183858 A1    Jun. 11, 2020

Related U.S. Application Data

(63) Continuation of application No. 16/210,074, filed on Dec. 5, 2018, now Pat. No. 10,621,106.

(51) Int. Cl.
*G06F 12/00* (2006.01)
*G06F 12/1045* (2016.01)
*G06F 12/1018* (2016.01)

(52) U.S. Cl.
CPC ...... *G06F 12/1045* (2013.01); *G06F 12/1018* (2013.01); *G06F 2212/651* (2013.01)

(58) Field of Classification Search
CPC .. G06F 12/10; G06F 12/1009; G06F 12/1018; G06F 12/1027; G06F 12/1045; G06F 2212/651
See application file for complete search history.

(56) References Cited

U.S. PATENT DOCUMENTS 9,256,550 B2   2/2016   Bybell et al.
9,405,567 B2   8/2016   Robenko et al.
(Continued)

FOREIGN PATENT DOCUMENTS

CN    101957775 A    1/2011
KR    20030018721 A    3/2003

OTHER PUBLICATIONS

Wang, T. et al., "Hardware Supported Persistent Object Address Translation," Proceedings of the 50th Annual IEEE/ACM International Symposium on Microarchitecture, Oct. 14-18, 2017, pp. 800-812.
(Continued)

*Primary Examiner* — Shawn X Gu
(74) *Attorney, Agent, or Firm* — Scully, Scott, Murphy & Presser, P.C.

(57) ABSTRACT

A computer system includes a translation lookaside buffer (TLB) data cache and a processor. The TLB data cache includes a hierarchical configuration comprising a first TLB array, a second TLB array, a third TLB array, and a fourth TLB array. The processor is configured to receive a first address for translation to a second address, and determine whether translation should be performed using a hierarchical page table or a hashed page table. The processor also determines (using a first portion of the first address) whether the first array stores a mapping of the first portion of the first address in response to determining that the translation should be performed using the hashed page table, and retrieving the second address from the third TLB array or the fourth TLB array in response to determining that the first TLB array stores the mapping of the first portion of the first address.

19 Claims, 13 Drawing Sheets

(56) References Cited

U.S. PATENT DOCUMENTS

| | | |
|---|---|---|
| 9,552,243 B2 | 1/2017 | Chen et al. |
| 10,621,106 B1 * | 4/2020 | Campbell ............ G06F 12/1018 |
| 2014/0101364 A1 * | 4/2014 | Gschwind ............. G06F 12/109 |
| | | 711/6 |

OTHER PUBLICATIONS

Alam, H. et al., "Do-It-Yourself Virtual Memory Translation," Proceedings of the 44th Annual International Symposium an Computer Architecture, Jun. 24-28, 2017, 12 pages.

List of IBM Patents or Patent Applications Treated as Related, dated Jan. 27, 2020, 2 pages.

* cited by examiner

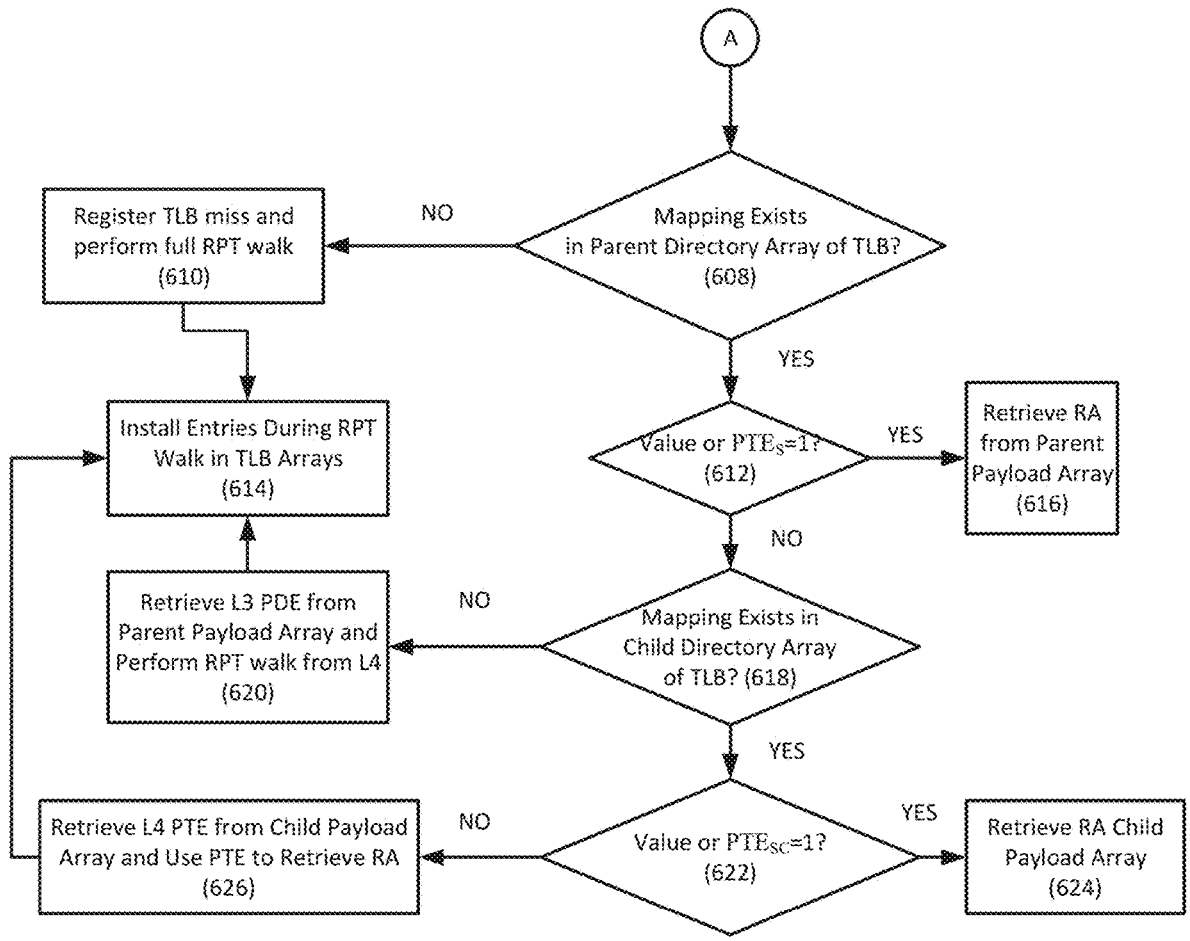
FIG. 6 (contd.)

METHODS AND SYSTEMS FOR INCORPORATING NON-TREE BASED ADDRESS TRANSLATION INTO A HIERARCHICAL TRANSLATION LOOKASIDE BUFFER (TLB)

BACKGROUND

The disclosure herein relates generally to data processing, and more particularly, to methods, apparatus, and products for optimizing lookups in a translation lookaside buffer (TLB) in a computer system.

Memory management, i.e., the operations that occur in managing the data stored in a computer, is often a key factor in overall system performance for a computer. Among other tasks, memory management oversees the retrieval and storage of data on a computer, as well as manages certain security tasks for a computer by imposing restrictions on what users and computer programs are permitted to access.

System configurations include physical memory used to store applications and data. The amount of physical memory is fixed and often inadequate to support the needs of users. Therefore, to provide additional memory or at least the appearance of additional memory, a memory management technique, referred to as virtual memory, is utilized. Virtual memory uses virtual addressing, which provides ranges of addresses that can appear to be much larger than the physical size of main memory.

Virtual addressing is a memory mapping mechanism that is used by operating systems for purposes such as security based on process isolation. Using virtual addressing, processors can access memory, using physical addresses that are generated from Virtual Address (VA) to Physical Address (PA) translation. To accelerate the VA to PA translation process, processors can use Translation Lookaside Buffers (TLB). A TLB is essentially a cache of page table entries mapping virtual addresses to physical addresses. With each memory access, the TLB is presented with a virtual address. If the address hits in the TLB, virtual address translation adds little or no overhead to the memory access. If the address misses in the TLB, a more costly hardware handler or software handler is invoked to load and insert the required page table entry into the TLB so the address will hit in the TLB and the memory access can proceed.

Embedded processors with software loaded TLBs can have poor performance on some workloads. Responsible for this poor performance is the overhead of resolving in software the virtual address translations that aren't cached in the TLB. This is generally why higher end processors provide a hardware mechanism to load translations in the TLB automatically. Such hardware mechanisms, however, tend to be complex and expensive. There are several conventional approaches to hardware loading of virtual address translations. These conventional approaches include: tree structured page tables; hashed page tables; virtual linear page tables; page table pointer caches; and TLBs with both page table pointers and page table entries. Each of these approaches is discussed briefly below.

The tree structured page tables (e.g., Radix address translation) approach uses a tree structure in memory. The root of the tree is identified by a physical address in memory, and bits from the virtual address are used as an index at each level of the tree until a page table entry is found. While the final page table entry (PTE) found in the tree structure is cached in a TLB, the intermediate at each level are cached in a page walk cache (PWC).

Another conventional approach to hardware loading of virtual address translations into TLBs utilizes hashed page tables (HPT). In HPT translation, For instance, in PowerPC systems offered by International Business Machines Corporation, an effective address is translated to a corresponding real address by way of page table entries found by selecting an effective segment identifier (ESID) table entry associated with the effective address, and using the entry to locate a group of page table entries by way of a hashing algorithm.

Tree structured page tables and HPT require different hardware structures (e.g., HPT requires a segment lookaside buffer (SLB) and Radix requires a PWC). Furthermore, the TLB structures of the HPT and Radix translations are also different. However, simultaneous multithreading (SMT) often includes some instruction threads running HPT address translation and other threads running Radix address translation. Hence, both translation algorithms must be supported concurrently in current processing systems.

Certain existing systems solve this problem by dividing the TLB indices into two sets, and assigning one set to HPT translation and the other set to Radix translation. While this allows the system to use a single TLB for supporting both translation schemes, division of the TLB in such a manner means that the HPT threads and the Radix threads can only use a part of the TLB at a time, leading to a decrease in TLB efficiency.

SUMMARY

The summary of the disclosure is given to aid understanding of a computer system, computer architectural structure, processor, and method of promoting Effective to Real Address Translation entries in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

According to an embodiment of the present disclosure, a computer system includes a translation lookaside buffer (TLB) data cache and a processor. The TLB data cache may include a hierarchical configuration comprising a first TLB array, a second TLB array, a third TLB array, and a fourth TLB array. The processor may be configured to receive a first address for translation to a second address, and determine whether translation should be performed using a hierarchical page table or a hashed page table. The processor may also be configured to determine (using a first portion of the first address) whether the first array stores a mapping of the first portion of the first address in response to determining that the translation should be performed using the hashed page table, and retrieving the second address from the third TLB array or the fourth TLB array in response to determining that the first TLB array stores the mapping of the first portion of the first address.

In one or more embodiments, retrieving the second address from the third TLB array or the fourth TLB array may include determining whether an entry in the second TLB array is relevant to the translation by analyzing based on a bit value of an entry in the stored mapping, and retrieving the second address from the third TLB array in response to determining that the entry in the second TLB array is not relevant to the translation. Optionally, the processor may also be configured to also include in response to determining that the entry in the second TLB array is relevant to the translation: determining whether the second TLB array stores a mapping of the second portion of the first address based on a second portion of the first address, and retrieving the second address from the fourth array in response to determining that the second TLB array stores the mapping of the second portion of the second address.

In certain embodiments, the processor may also be configured to may also include, in response to determining that the first TLB array of the TLB data cache does not store a mapping of the first portion of the first address, determining the second address by performing a hashed page table page walk. Optionally, the processor may cache the second address in one or more of the following: the third TLB array or the fourth TLB array. The processor may then create a first entry in the first TLB array. The first entry may include the first portion of the first address, partition ID bits corresponding to the first address, and/or a bit value indicating whether an entry in the second TLB array is relevant to translation of the first address to the second address, wherein the bit value is chosen based on a page size of a page associated with the second address. The bit value may be assigned to indicate that entries in the second TLB array are not relevant to translation of the first address to the second address if the page size of the page associated with the second address is 16 GB. Alternatively, the bit value is assigned to indicate an entry in the second TLB array is relevant to translation of the first address to the second address if the page size of the page associated with the second address is at least one of the following: 4 KB, 64 KB, or 16 MB.

Optionally, the processor may also create a second entry in the second TLB array. The second entry may include a second portion of the first address, the page size of the page associated with the second address, and/or a pointer to the first entry in the first TLB array.

In certain embodiments, the processor may be configured to, in response to determining that the second TLB array does not store the mapping of the second portion of the first address: determine the second address by performing the hashed page table page walk, caching the second address in either the third TLB array or the fourth TLB array, and create an entry in the second TLB array. The entry in the second array may include the second portion of the first address, the page size of the page associated with the second address, and/or a pointer to an entry corresponding to the mapping of the first portion of the first address in the first TLB array.

In yet other embodiments, the processor may be configured to, in response to determining that the translation should be performed using the hierarchical page table, determine, whether the first TLB array stores a mapping of the third portion of the first array based on a third portion of the first address, and retrieve the second address from the third TLB array or the fourth TLB array in response to determining that the first TLB array stores the mapping of the third portion of the first address. Optionally, the processor may, in response to determining that the first TLB array does not store the mapping of the third portion of the first address determine the second address by performing a hierarchical page table walk, and cache one or more steps of the hierarchical page table walk in one or more arrays of the TLB. The processor may also retrieve the second address from the third TLB array if the page size of the page associated with the second address is 1 GB.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, assemblies, systems, circuitry, embodiments, or devices shown, and the arrangements, structures, subassemblies, features, aspects, methods, processes, circuitry, embodiments, and devices shown may be used singularly or in combination with other arrangements, structures, assemblies, subassemblies, systems, features, aspects, circuitry, embodiments, methods and devices.

DETAILED DESCRIPTION

Figure 1A:
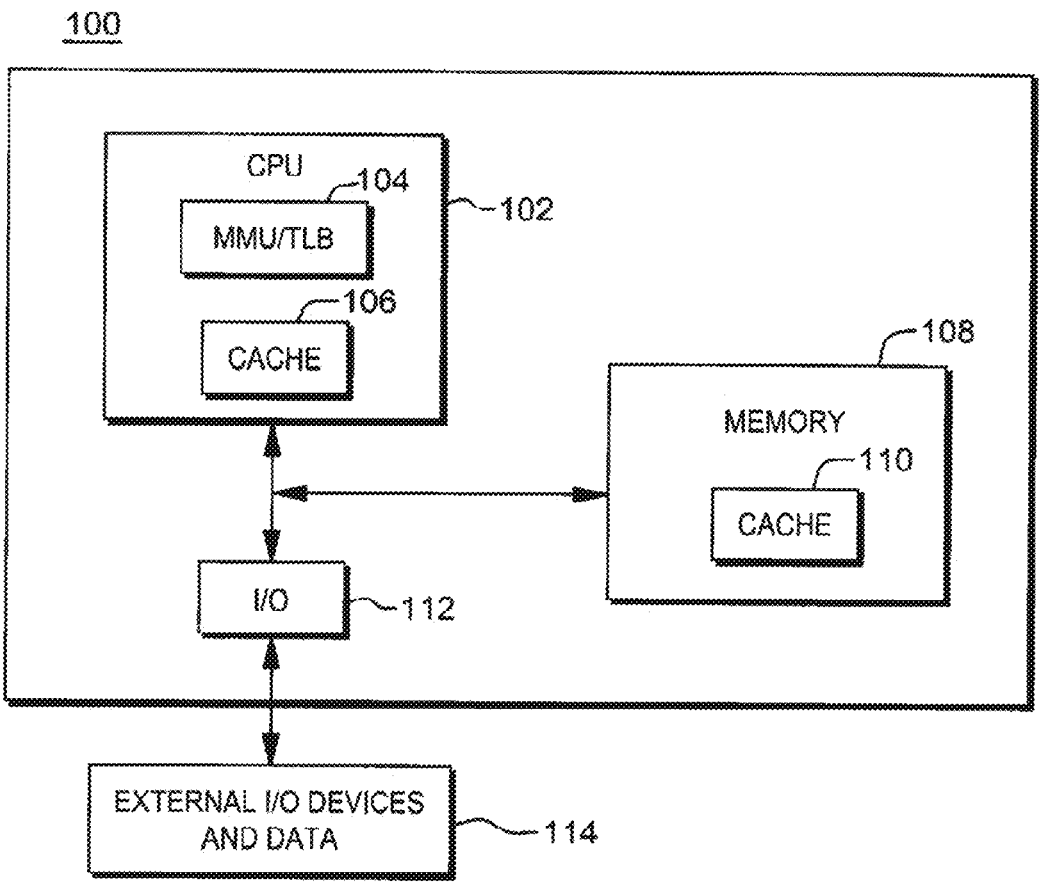
FIG. 1A depicts one example of a computing environment.

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes conventional features of information processing systems, including processors and microprocessor systems and architectures, which are apparent to those skilled in the art. It is assumed that those skilled in the art are familiar with the general architecture of processors, and in particular with TLBs and their operation. It may be noted that a numbered element is numbered according to the figure in which the element is introduced, and is typically referred to by that number throughout succeeding figures.

A virtual address is translated into a corresponding physical address using a Translation Lookaside Buffer (TLB). TLB is a data structure used for caching some of the mappings between the addresses in a given virtual address space and addresses in a given physical address space.

A page table maps virtual addresses to real addresses on a page-by-page basis and includes one or more page table entries (PTEs). A PTE represents a page of data residing in physical memory. Some but not all of the pages having corresponding page table entries in a page table are represented in a TLB. Finding a mapping or match in a given TLB between a virtual address and a physical address indicates that the page is available in the physical memory. Not finding a mapping or match in a given TLB between a virtual address and a physical address does not exclude a possibility that the page could be available in the physical memory, and the page table should be additionally checked before it can be determined whether the page exists in the physical memory.

Furthermore, 64-bit addressing is used as an example for the clarity of the description and not as a limitation on the illustrative embodiments. An embodiment can be practiced with an addressing system of any size in a manner described herein and is contemplated within the scope of the illustrative embodiments.

One example of a computing environment to incorporate and use one or more aspects of the translation capability is described with reference to FIG. 1A. In one example, a computing environment 100 includes a processor (central processing unit—CPU) 102 that includes at least one memory management unit (MMU)/translation lookaside buffer (TLB) portion 104 and a cache 106. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. To improve address translation, the memory management unit utilizes a translation lookaside buffer (TLB). The TLB is a cache of previously translated addresses. Thus, when a request is received for a memory access that includes an address to be translated, the TLB is checked first. If the address and its translation are in the TLB, then no translation is necessary. Otherwise, the received address is translated using one of any number of translation techniques.

Figure 1B:
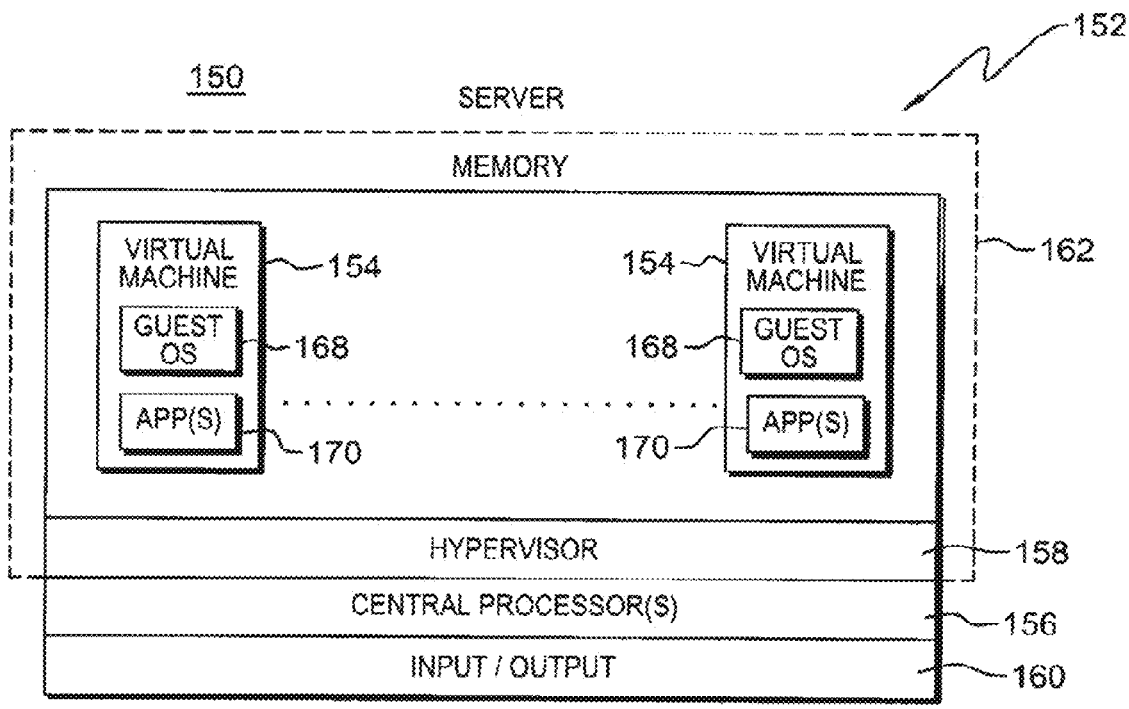
FIG. 1B depicts another example of a computing environment.

A further embodiment of a computing environment to incorporate and use one or more aspects of the present invention is depicted in FIG. 1B. In this example, a computing environment 150 includes a server 152 that includes, for instance, one or more virtual machines 154, one or more central processors (e.g., central processing units) 156, at least one hypervisor 158, and an input/output subsystem 160. The virtual machines and hypervisor are included in memory 162.

In this embodiment, each virtual machine is capable of hosting a guest operating system 168 and may be executing one or more applications 170. An operating system or application running in a virtual machine appears to have access to a full complete system, but in reality, only a portion of it is available.

Central processors 156 (e.g., central processing units) are physical processor resources that are assignable to a virtual machine. For instance, virtual machine 154 includes one or more logical processors, each of which represents all or a share of a physical processor 156 that may be dynamically allocated to the virtual machine. Virtual machines 154 are managed by hypervisor 158, such as PowerVM, offered by International Business Machines Corporation, as an example.

Central processor 156, like CPU 102, includes at least one MMU/TLB portion and at least one cache.

Input/output subsystem 160 directs the flow of information between devices and memory (also referred to herein as main memory or main storage). It is coupled to the server in that it can be part of the server or separate therefrom. The I/O subsystem relieves the central processors of the task of communicating directly with the I/O devices coupled to the server and permits data processing to proceed concurrently with I/O processing.

Figure 2A:
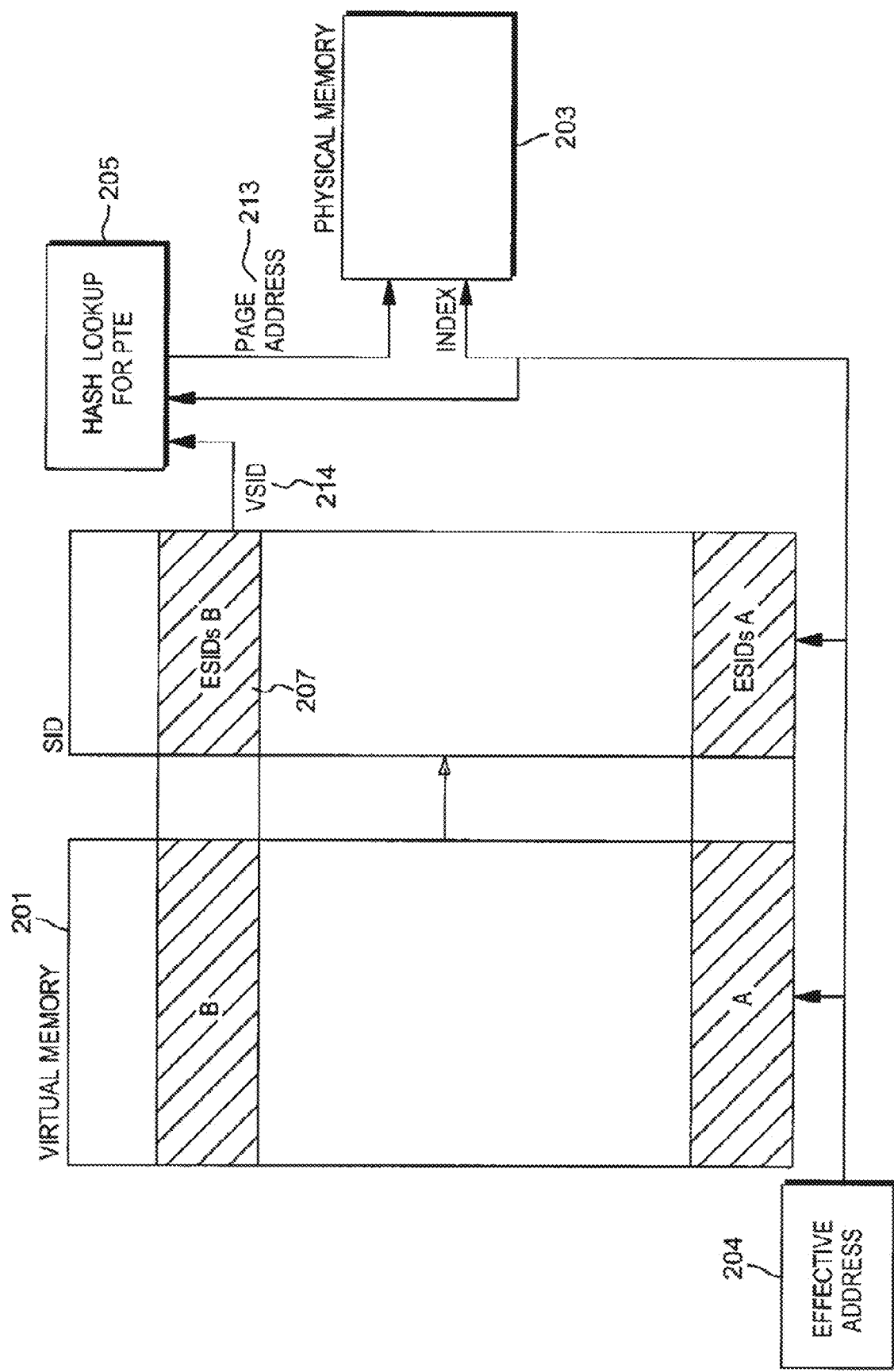
FIG. 2A illustrates an example of a high-level view of a virtual memory mapped to a physical memory using a hash page table technique.

Further details regarding the physical memory used by either system, such as memory 108 or memory 162, and access thereto are described with reference to FIG. 2A. As is known, physical memory is of a defined size and in order to have the physical memory appear larger than it is, virtual memory is utilized. One example of a high-level view of virtual memory 201 mapped to a physical memory 203 (such as memory 108, 162) is depicted in FIG. 2A. In this example, the mapping from virtual memory to real memory is via a hash page table (HPT) technique 205 to locate page table entries (PTEs), as used by, for example, Power ISA. In this example, programs only use sections A and B of the virtual memory. Each segment of the virtual memory is mapped to a segment ID (SID) entry 207 identified by an effective segment ID (ESID) (ESIDs for B and ESIDs for A included). An "effective address" 204 used by the program selects an SID entry, which includes the ESID value, as well as a virtual segment ID (VSID) 214 value. The VSID value represents the high-order bits of a virtual address to be used by hashing algorithm 205 to search the hash page table. A hashed value based on the VSID is used to locate a page table entry (PTE). The page table entry (PTE) includes an address 213 of a page of physical memory 203.

Figure 2B:
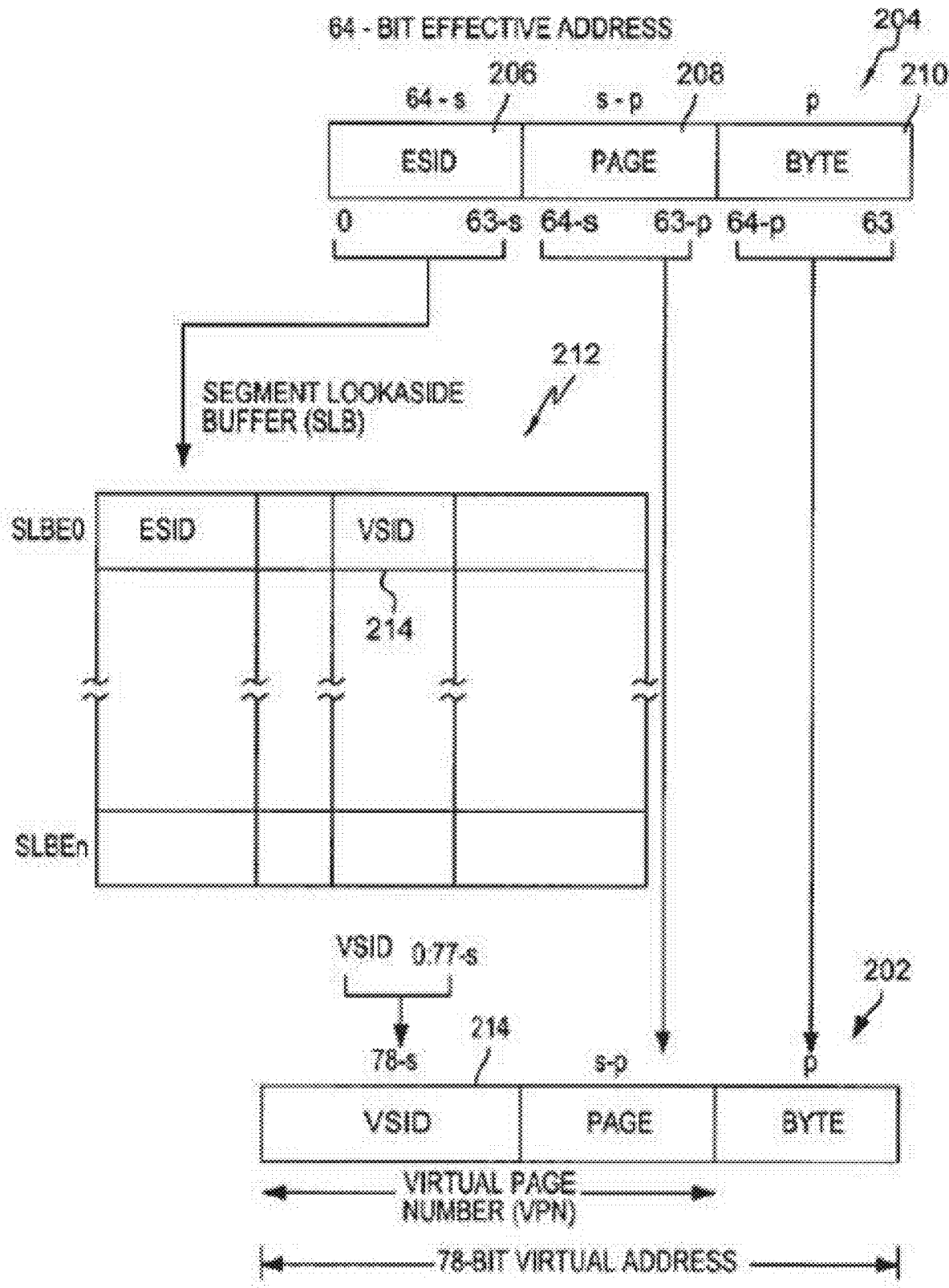
FIG. 2B illustrates one example of a technique for generating a virtual address.

FIG. 2B illustrates an example of a technique for generating a virtual address 202 for hashing. In this regard, an effective address 204 is received in, for instance, a memory management unit of a processor. Effective address 204 includes an effective segment identifier (ESID) field 206, a page field 208 and byte offset field 210. The ESID field is used to locate an entry in a segment lookaside buffer (SLB) 212, which is a cache of recently accessed segment ID entries. In particular, the SLB is searched for an entry with a value of ESID 206 of the effective address 204. The entry with the ESID 206 includes an associated virtual segment identifier (VSID) 214, as well as other information, as described below. The associated VSID is used to generate virtual address 202, which includes VSID 214; and page 208 and byte 210 from the effective address 204. Virtual address 202 is used to obtain a real address used to access physical memory in the memory system. In this disclosure, the terms physical memory, real memory, system memory and absolute memory are used interchangeably to refer to the main storage accessible to a processor.

Figure 2C:
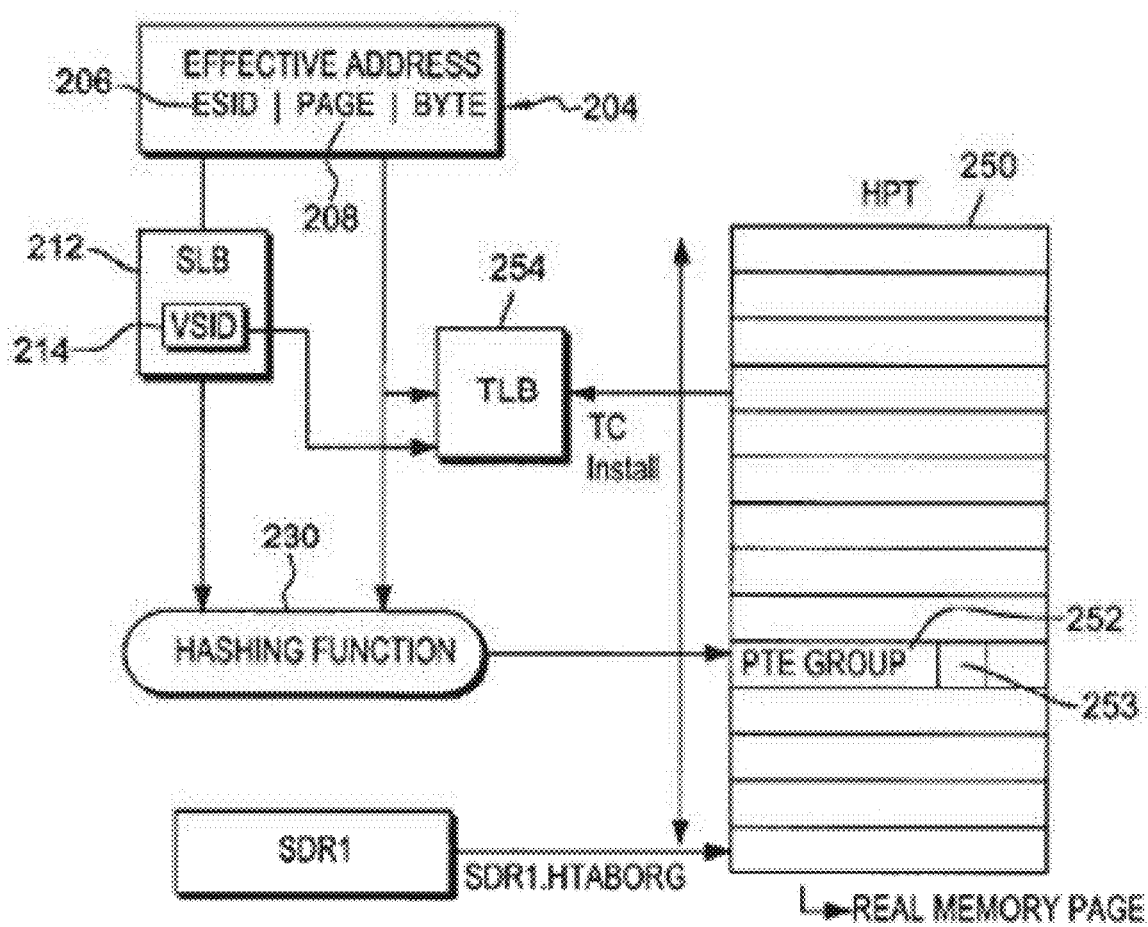
FIG. 2C depicts one example of a hash page table translation structure.

FIG. 2C illustrates an example of a hash page table (HPT) translation structure used by Power ISA. ESID portion 206 of an effective address (EA) 204 is used to locate an entry in SLB 212. The entry includes a VSID field 214. The value of VSID field 214 and a portion of EA 204 (page.byte) are hashed 230 to produce a hash value that is used to locate a page table entry (PTE) group 252 in a hash page table (HPT) 250. Page table entries 253 of PTE group 252 are searched to locate a corresponding PTE having a field matching a value of a most-significant-portion of the VSID. When a corresponding PTE is found, the address (e.g., real address) of the physical memory page in the PTE is used to access physical memory. In order to improve performance, once a PTE entry is found, the page portion 208 of EA 204 and the address of the physical memory page found in the PTE are stored in the TLB 254, such that further accesses to the same EA page will "hit" in the TLB 254 and avoid the PTE search. The page table is located by a page table origin address provided by the processor.

Figure 5A:
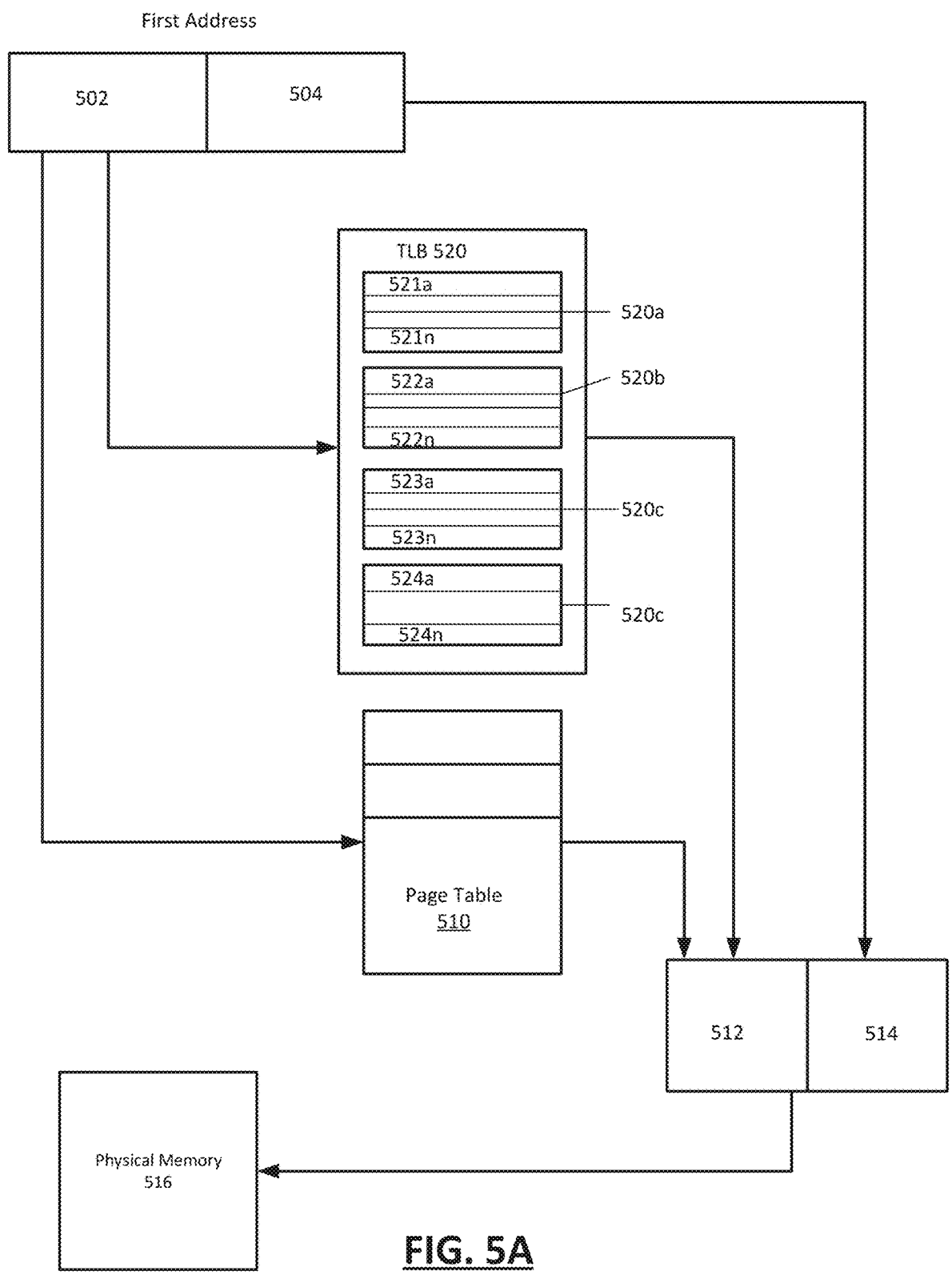
FIG. 5A illustrates a block diagram illustrating a system for resolving virtual addresses using a TLB and a page table, according to embodiments of the present disclosure.
Figure 5B:
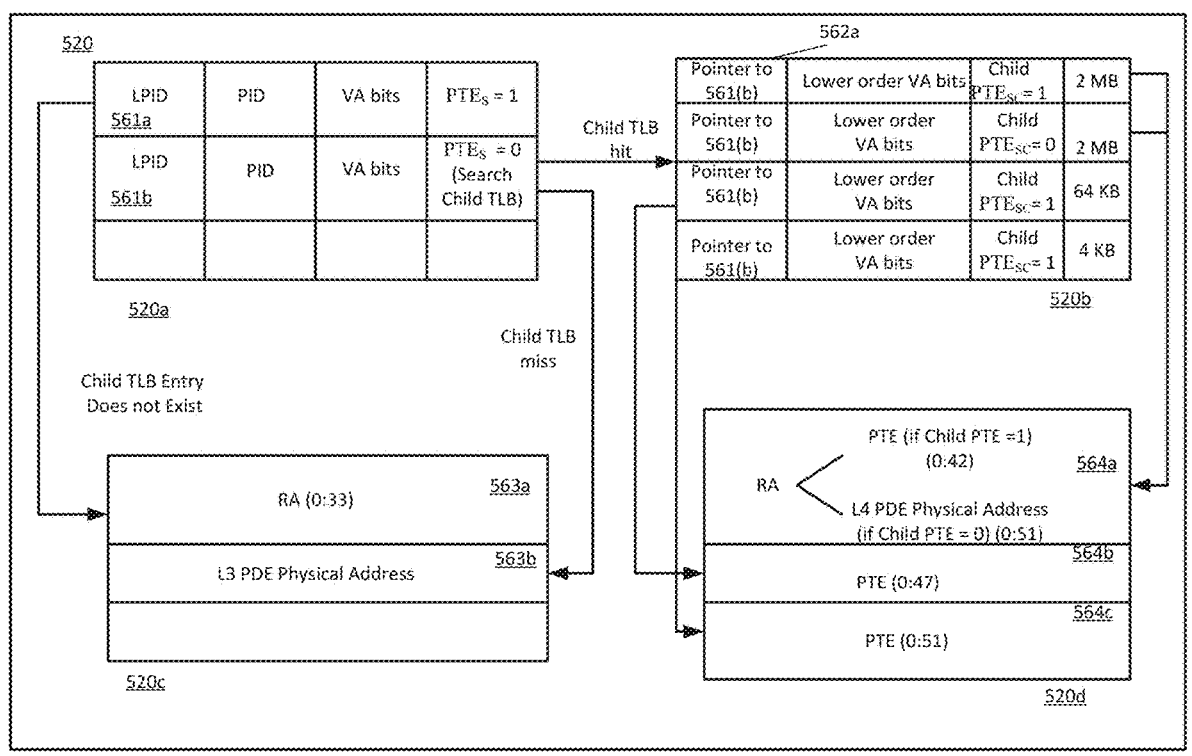
FIG. 5B illustrates a block diagram of an example TLB design for caching RPT mode page walk steps and/or PTEs according to embodiments of the present disclosure.
Figure 5C:
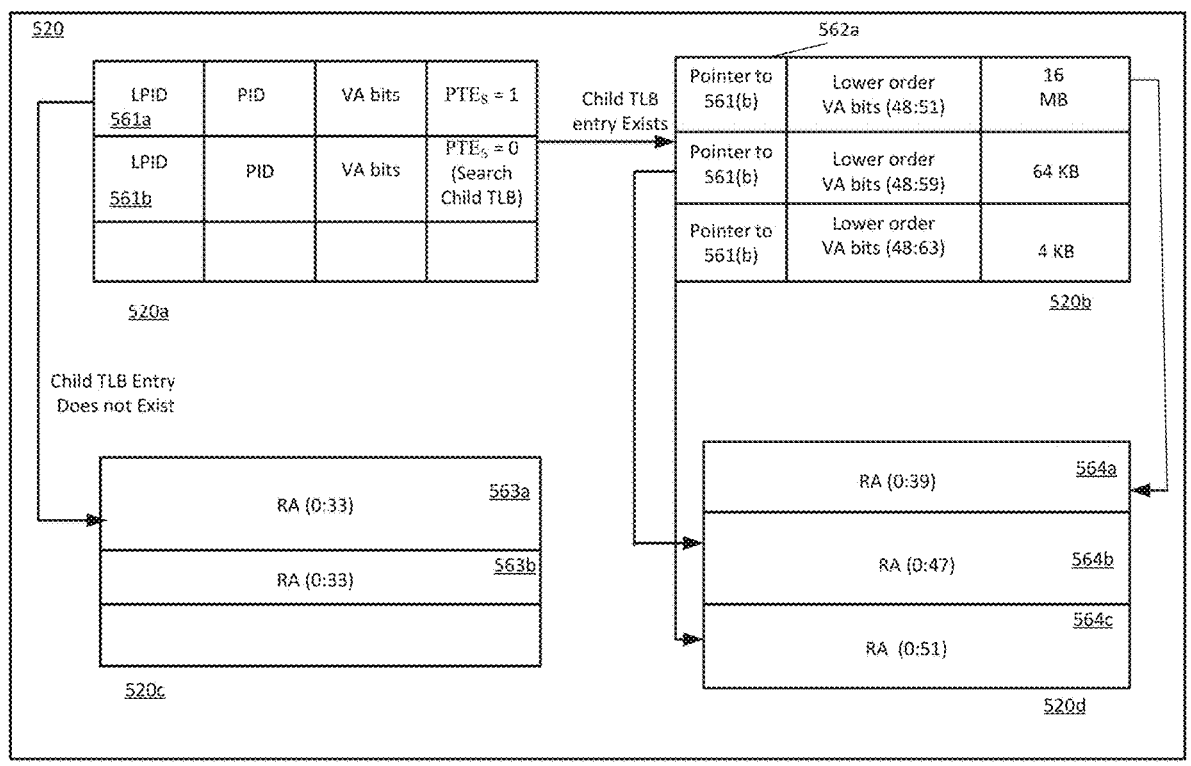
FIG. 5C illustrates a block diagram of an example TLB design for caching HPT mode page walk steps and/or PTEs according to embodiments of the present disclosure.

Further details regarding TLB 254 are described in more detail with references to FIGS. 5A-5C.

Further information regarding a hashed page table is described with reference to FIG. 3. In this example, the page table and its corresponding entries are for the Power ISA architecture; however, other page tables and entries may be used for other architectures.

Figure 3:
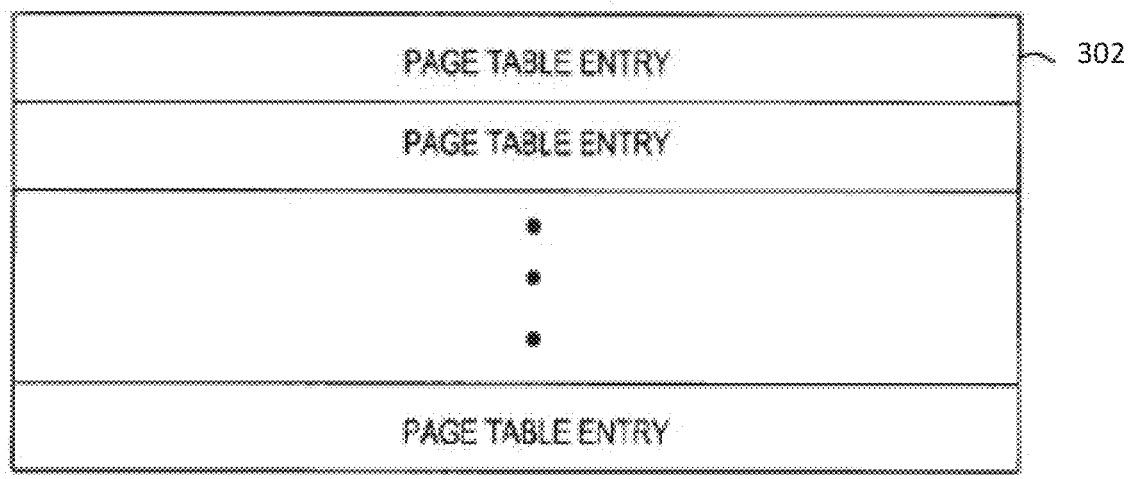
FIG. 3 depicts one example of a hashed page table.

Referring initially to FIG. 3, a page table 300 includes one or more page table entries 302. As one example, page table 300 is a hash page table (HPT), which is a variable-sized data structure that specifies the mapping between virtual page numbers (VPN) and real page numbers (RPN), where the real page number of a real page is, for instance, bits 0:47 of the address of the first byte in the real page. The hash page table size can be any size $2^n$ bytes where $18 \le n \le 46$. The hash page table is to be located in storage having the storage control attributes that are used for implicit accesses to it. In one embodiment, the starting address is to be a multiple of its size unless the implementation supports a server.relaxed page table alignment category, in which case its starting address is a multiple of $2^{18}$ bytes, as an example.

In one example, the hash page table contains page table entry groups (PTEGs). A page table entry group contains, for instance, eight page table entries of 16 bytes each; each page table entry group is thus 128 bytes long. PTEGs are entry points for searches of the page table.

Further details regarding one implementation of page tables and page table entries are described in Power ISA™ Version 2.06 Revision B specification, Jul. 23, 2010, offered by International Business Machines Corporation and incorporated herein by reference in its entirety.

The use of a hash page table to translate addresses is only one example of a translation technique. Other address translation schemes, including those that use a hierarchy of translation tables, are described below, as well as in the following publications: z/Architecture—Principles of Operation, Publication No. SA22-7932-08, 9th Edition, August 2010, and Intel Itanium Architecture Software Developer's Manual Volume 2: System Architecture, Document Number: 245318-005, each hereby incorporated herein by reference in its entirety. In one example, for the z/Architecture, the hierarchy of tables is referred to as dynamic address translation (DAT) tables; and for Power ISA, the tables are referred to as radix tables.

Figure 4A:
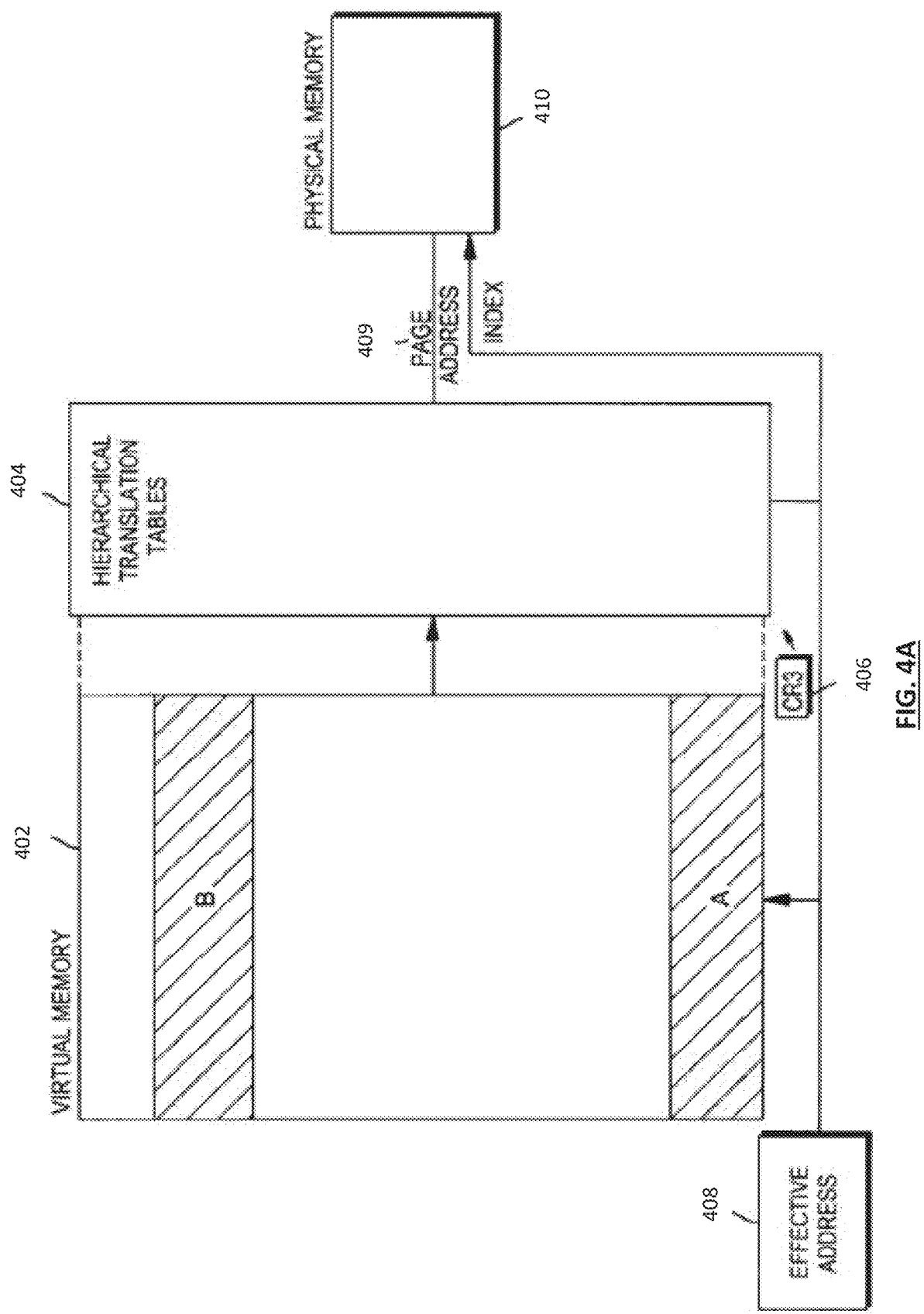
FIG. 4A depicts one example of a hierarchical translation mechanism.

One example of a hierarchical translation table translation mechanism is described with reference to FIG. 4A. In this example, translation tables 404 are provided for translating addresses of virtual memory 402, though only regions A and B are to be used, in this example, to real addresses. The origin of the highest order translation table of the hierarchical translation tables 404, is provided, for example, by a control register (CR3) 406. An effective address 408 is used to index into each table of the hierarchical translation tables 404 to determine an origin address of the next table until, for example, a page table entry (PTE) having an address 409 of a page of physical memory 410 is located. In one example in which the translation mechanism is DAT, the effective address is a virtual address having a plurality of indices used to index into the translation tables.

Figure 4B:
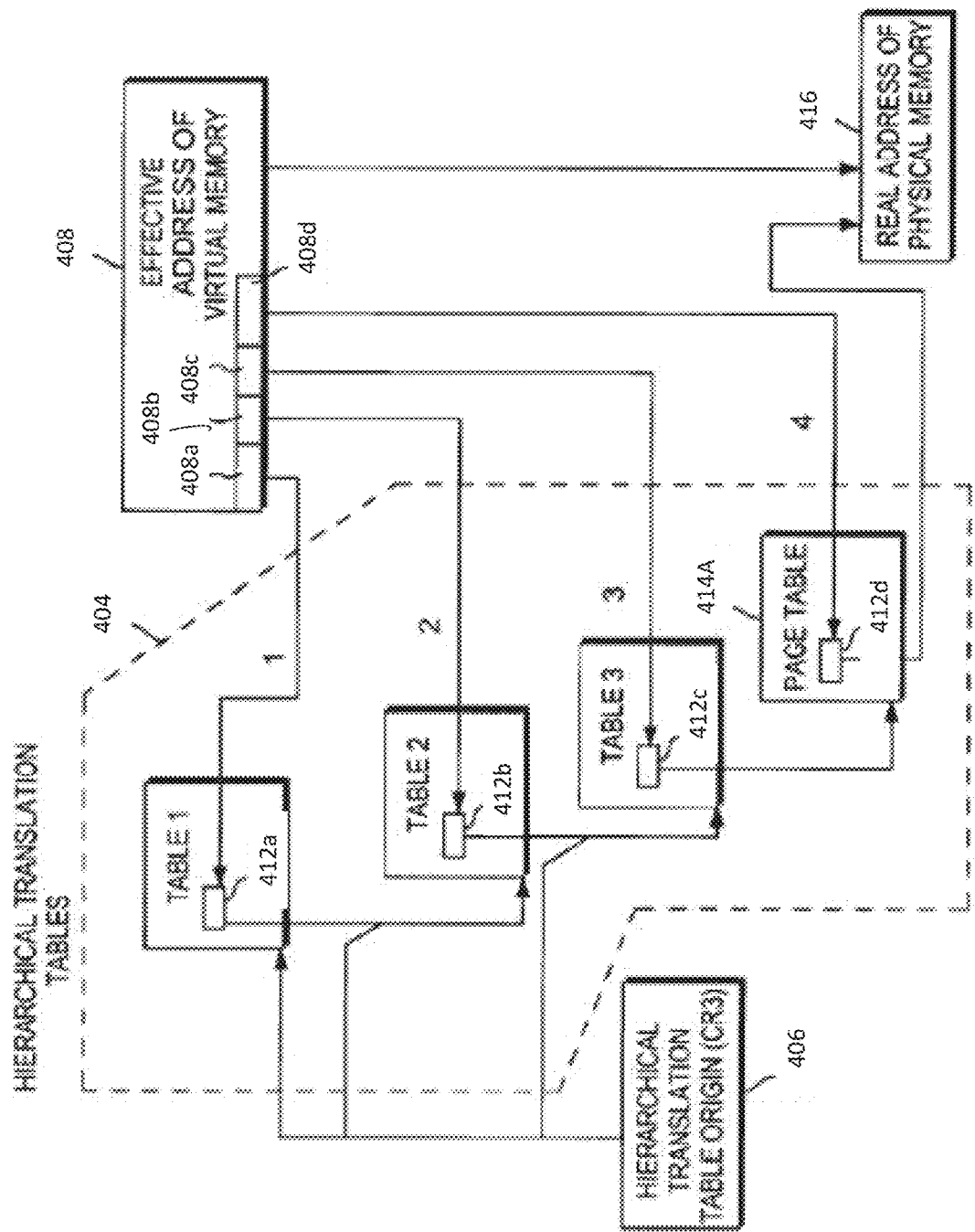
FIG. 4B depicts one example of indexing of high-level translation tables.

FIG. 4B shows one example in which the highest level translation table of the hierarchy is "indexed" by the high portion 408a of an effective address 408 to locate a Table 1 entry 412a that is used to locate the next translation table (Table 2). That is, entry 412a includes an origin address of Table 2. Similarly, a next portion 408b of the effective address 408 is used to index into Table 2 to find a Table 2 entry 412b having the origin address of Table 3. A next portion of the effective address 408c is used to index into Table 3 to find a Table 3 entry 412c having an origin address of a Page Table 414a. A next portion 408d of the effective address 408 is used to index into Page Table 414a to locate a page table entry 412d having the address of a physical memory page 416. The origin of the hierarchy of translation tables, in one embodiment, may include a table selector field for determining which of the hierarchy of translation tables, the origin applies. Thus, the translation may require only a subset of the hierarchy (wherein an effective address is limited to include a predetermined number of most significant bits having a zero value). A translation using fewer tables will be faster than one using more tables.

In an embodiment, the intermediate entries (412a, 412b, and 412c) and the page table entry 412d of the translation or page walk illustrated in FIG. 4B are stored in a hierarchical TLB 420, as described below.

A page table entry located by traversing the hierarchical page tables includes various information including at least a portion of a real address used to access the physical memory. The format and information included in the page table entry depends on the architecture of the system configuration and/or the specific type of translation. The radix page table (RPT) is, for instance, a hierarchical, variable sized data structure that specifies the mapping between virtual page numbers and real page numbers, virtual page numbers and virtualized real page numbers, or virtualized real page numbers and real page numbers, where the real page number of a real page is, for instance, bits 0-44 of the address of the first byte of the real page. The radix page table is located in storage having the storage control attributes that are used for implicit access to it. The starting address is aligned in one example to a 4K boundary. The radix page table includes a series of 512-entry tables, in one embodiment.

In accordance with one aspect, a system configuration is provided with different types of address translation structures for use in translating addresses. As examples, one type uses a hierarchical data structure (e.g., a radix structure), and another type uses a hash data structure. It will be appreciated that the architecture illustrated in FIGS. 1-4 is merely exemplary in nature, and the invention may be utilized in a wide variety of other architectures utilizing address translation.

FIG. 5A illustrates a block diagram illustrating a system for translating a received address (e.g., a virtual address or an effective address) to a different address (e.g., a physical address) using a TLB and a page table, according to the embodiments disclosed herein. As shown in FIG. 5A, the address translation system 500 includes a TLB 520, a page table 510, and a physical memory 515. The page table 510 may be an HPT or an RPT.

When a data entry stored in the data array of a cache is a TLB entry, the data array stores the physical address of the data. A tag array of the cache has a plurality of tag entries each of which store a tag and an identification for each data entry in the data array, and the tag acts as the search key for the cache. In a TLB, the search key is a virtual address or part of a virtual address. The physical address corresponds to a location in another memory where the actual data is stored. The other memory may be, for example, a random access memory ("RAM"), a local hard drive associated with the processor, a memory connected to the processor via a network connection or any other type of memory which can be accessed by the processor. If a requested index is present in the tag array, the cache yields a match and then retrieves a physical address stored in the data array which can be used by the processor to access memory. For purposes of this description, a "cache hit" refers to this type of matching condition. The processor supplies an address (in the case of a TLB, this is a virtual address or parts of a virtual address) for which it would like the cache to return the corresponding physical address. This virtual address is broken into two parts: one part (the index) is used to select one entry from the tag array. (In the case of a multi-way set-associative cache/TLB it actually selects a "set" of tags—hence the name 'set-associative'). The tag stored in the tag array at that index is compared against the remainder of the virtual address (that is, the original virtual address leaving out the part used as an index). If the remaining part of the virtual address matches the tag stored in that location of the tag array, the corresponding entry from the data array is returned; that is, the data stored at the same index in the data array as the tag which was accessed. If the requested index is not in the tag array, then a "miss" or a "cache miss" results, and the processor proceeds to find the location of the requested data by looking up a page table in a process called a page walk. A page table is a data structure used by a virtual memory system in an operating system ("OS") to store a mapping between virtual addresses and physical addresses. Virtual addresses may be unique to a software process, whereas physical addresses are unique to each piece of hardware, for example, a CPU, RAM, hard drive, etc.

In an embodiment, the TLB 520 is designed as a hierarchical TLB that is configured to store entries for both the HPT mode and the RPT mode in one or more caches. As shown in FIG. 5, TLB 520 is configured to include four different hardware structures or caches 520a, 520b, 520c, and 520d arranged in a hierarchical manner (i.e., 4 levels of cache hierarchy). The four TLB arrays are configured to cache entries for both the HPT mode and the RPT mode page walks. In an embodiment, the four TLB arrays 520a, 520b, 520c, and 520d of the TLB 520 are used to cache page table entries (PTEs) when operating in an HPT mode, and to cache PTEs as well as intermediate translation steps (i.e., page directory entries (PDEs)) when operating in a RPT mode (described below). It will be understood to those skilled in the art that while FIG. 5A illustrates that the TLB 520 includes four caches, the disclosure is not so limiting and the TLB 520 may include less or more caches.

Each row in an array (521a-n in array 520a, and 522a-n in array 520b, 523a-n in array 520c, and 524a-n in array 520d) represents an entry in that array. The information included in each entry depends on the type and/or level of the array in the hierarchy as well as whether the entry corresponds to a RPT mode translation or an HPT mode translation. Each entry in the TLB arrays represents a particular page size: 4 KB, 64 KB, 16 MB, and 16 GB (for an example HPT mode); and 4 KB, 64 KB, 2 MB, and 1 GB (for an example RPT mode), that is, all page sizes are natively supported in TLB 520 and consume only one entry. It will be understood to those skilled in the art that these page sizes are exemplary and other page sizes are within the scope of this disclosure. During translation, entries are installed in the TLB arrays 520a, 520b, 520c, and 520d in a hierarchical manner and/or TLB arrays 520a, 520b, 520c, and 520d are searched in a hierarchical manner for a TLB hit, as described below. Furthermore, the TLB arrays 520a, 520b, 520c, and 520d include one or more memory structures to maintain pointers (e.g., set, way of a TLB array) that point to entries within another level of the hierarchical TLB and/or an HPT mode or RPT mode page walk.

The TLB arrays 520a, 520b, 520c, and 520d may be configured in any now or hereafter known format (e.g, an N-way set associative TLB array, fully associative TLB array, or the like). A variety of indexing schemes, known to those of ordinary skill in the art, may be used for TLB indexes. Other sizes and configurations for the TLB are within the scope of this disclosure.

Referring back to FIG. 5A, the received address may include effective address bits 502 and an offset 505. The effective address bits 502 are transmitted to the TLB 520, which attempts to match the effective address bits 502 with a virtual page number (not shown) stored in the TLB 520. The TLB 520 may execute the matching logic hierarchically and based on the type of address translation (HPT or RPT), as described below in FIGS. 5B, 5C, and 6. If the TLB 520 finds an entry containing a virtual page number matching the effective address bits 502, it provides a physical address 512.

In one embodiment, if a match is not found (TLB miss), the address translation system 500 fetches the physical address 512 from the page table 510 (e.g., by performing an HPT mode or an RPT mode page walk after a TLB miss). The virtual address resolution system 500 may also load the fetched physical address 512 into one or more of the arrays of the TLB 520 (as described below). Furthermore, one or more steps of the page walk are also installed in the arrays of the TLB 520. As shown in FIG. 5, the physical address 512 is used to address a page in the physical memory 516. The offset 514 is used to access an address relative to the beginning of the page.

FIG. 5B illustrates an overview of the TLB 520 and entries in the four TLB arrays cached during an RPT translation. For an RPT mode translation, the TLB arrays 520a, 520b, 520c, and 520d are configured to cache entries corresponding to some of the steps required during a page walk to determine a virtual address to physical address mapping in a hierarchical manner. In an illustrative embodiment, when the entries correspond to an RPT translation page walk, the four TLB arrays are configured as a parent TLB directory (520a), child TLB directory (520b), parent payload array (520c), and child payload array (520d).

In an embodiment, the TLB search for a real address begins in the parent TLB directory 520a. An entry 561a-n (or parent entry) in the parent TLB directory 520a includes a PTE bit, virtual address or effective address bits (0:33), and LPID bits (and/or PID bits). The value of the $PTE_S$ bit is indicative of whether or not a child TLB entry exists corresponding to entry 561 in array 520b (i.e., the child TLB directory). For example, the parent TLB directory 520a may be configured such that if the value of the $PTE_S$ bit is 1, it is indicative that a child TLB entry does not exist corresponding to entry 561 in array 520b and if the value of the $PTE_S$ bit is 0, it is indicative that a child TLB entry exists corresponding to entry 561 in array 520b (or vice versa). In certain embodiments, the $PTE_S$ bit is assigned a value 1 for 1 GB page sizes. In certain embodiments, the $PTE_S$ bit is assigned a value 0 for page sizes other than 1 GB (i.e., 4 KB, 64 KB, and 2 MB).

Some virtual address bits (e.g., 0:33) and the LPID (and/or PID bits) bits are used to look up matching entries in the parent TLB directory 520a. The virtual address bits (0:33) are chosen to accurately determine a parent TLB directory hit for the given page size. If a matching entry is not found in parent TLB directory 520a, then a TLB miss is registered. However, if a matching entry is found in parent TLB directory 520a, then the TLB search for the real address proceeds depending on the value of the $PTE_S$ bit in that entry.

If the value of the $PTE_S$ bit is 1 (i.e., no child TLB entry exists), the real address corresponding to the effective address is found in array 520c (the parent payload array). In such embodiments, entry 563a-n in the parent payload array 520c includes a real address corresponding to the virtual address when only a parent entry exists in the parent TLB directory 520a (i.e., the value of the $PTE_S$ bit in that parent entry indicates that a child TLB entry does not exist corresponding to that parent entry). There is a 1:1 mapping from each parent TLB directory 520a entry to an entry in the parent payload array 520c. Specifically, every parent TLB directory entry has its own corresponding parent payload entry. In other words, the structure of the TLB is configured such that when there is a hit in a certain parent TLB directory entry (set, way), there is a corresponding location in the parent payload array (set, way) from which the real address may be retrieved, and these mappings are pre-configured in the TLB.

In an embodiment, the real address in entry 563a includes 34 bits (0:33) for addressing a 1 GB page size. The real address bits are identified by looking up the virtual address bits included in the parent entry from the parent TLB array 520a, and then finding the corresponding parent payload entry. In certain embodiments, the entry may also include additional information, such as data access information. Examples of data access information include data access levels, such as limiting data access to read-only or allowing read operations and write operations, and subspace information, which defines programs that may access the real address included in entry 563a-n. Although some examples of additional information are provided by way of example, embodiments of the present disclosure encompass any additional information stored in an entry of a TLB array, where the additional information is not the virtual address or the real address.

If the value of the $PTE_S$ bit is 0 (i.e., a child TLB entry exists), TLB search continues to child TLB directory 520b. An entry 562a-n (or child entry) in the child TLB directory 520b may include lower order virtual address bits (depending on the page size), a parent TLB entry pointer, a child $PTE_{SC}$ bit, and a page size field. In an embodiment, the parent TLB entry pointer identifies the set and the row (or way) of the parent TLB directory 520a that includes the parent entry corresponding to entry 562. The number of lower order virtual address bits are selected based on the page size (for example, 34:42 for 2 M page sizes, 34:47 for 64 KB page sizes, 34:51 for 4 KB page sizes, or the like), and may be used to look up matching entries in the child TLB directory 520b. The child $PTE_{SC}$ bit value provides information relating to whether the corresponding entry in the child payload array 520d includes a real address or maps to an entry in the page walk cache. For example, the $PTE_{SC}$ bit is assigned a value 1 if the child payload array 520d provides the real address (i.e., a $PTE_{SC}$ hit) and the $PTE_{SC}$ bit is assigned a value 0 if the child payload array 520d caches a page walk step (i.e., PDE hit). If a match is found in the child TLB directory 520b, then the system analyzes the child $PTE_{SC}$ bit of the entry to determine how to use a corresponding entry in the child payload array 520d. Furthermore, the system uses the page size field to identify the page size of the corresponding entry in the child payload array 520d.

Similar to the 1:1 mapping between parent TLB directory 520a entries and parent payload array 520c entries, the TLB is also configured such that there is a 1:1 mapping between child TLB directory 520b entries and child payload array 520d entries. In other words, the structure of the TLB is configured such that when there is a hit in a certain child TLB directory entry (set, way), there is a corresponding location in the child payload array (set, way) from which the PTE/PDE may be retrieved, and these mappings are pre-configured in the TLB.

However, when the value of the $PTE_S$ bit in the parent TLB directory 520a is 0 and a match is not found in the child TLB directory 520b, the system retrieves an entry from the parent payload array 520c that maps to an entry found in L3 of the page walk of the Radix page table. In other words, entry 563b includes the page directory entry 412c (i.e., the physical address of the next step of the page walk which must be performed to complete the translation of the supplied virtual address to the final physical address which is sought). As discussed above, the entry in the parent payload array 520c is found using the 1:1 mapping between parent TLB directory 520a entries and parent payload array 520c entries.

Entry 564a-n in the child payload array 520d an entry that is either a PTE or a page walk PDE based on the value of the $PTE_{SC}$ bit in the corresponding child TLB directory 520b. The entry may also include additional information, such as data access information. Examples of data access information include data access levels, such as limiting data access to read-only or allowing read operations and write operations, and subspace information. Although some examples of additional information are provided by way of example, embodiments of the present disclosure encompass any additional information stored in an entry of a TLB array, where the additional information is not the virtual address or the real address.

In an embodiment, entries 561, 562, 563, and 564 are cached in the four TLB arrays 520a, 520b, 520c, and 520d during an RPT mode page walk as discussed below. Using the RPT mode page walk described in FIG. 4B as an example, when an RPT page walk is performed, various intermediary entries of the page walk (e.g., L1, L2, L3, and/or L4) may be saved as entries in the TLB arrays 520c, and/or 520d. In an embodiment, entry 561 includes a tag formed from a sub-set of the virtual address. As such, since the entries are installed in the array at an intermediate step during translation, it can cache the next level of the translation table structure. In other words, as discussed above the entries in the payload arrays 520c, and/or 520d may cache the physical address of the next step of the page walk (e.g., L3 PDE, L4 PTE, etc.) which must be performed to complete the translation of the supplied virtual address to the final physical address which is sought such that the system can start the page walk in RPT mode at an intermediate level.

Similarly, the parent TLB array 520a may be used to cache an L2 PDE pointer during translation if the page size is not 1 GB and assigned a $PTE_S$ value of 0. Furthermore, this parent TLB entry location is remembered by the table walker for later use in the translation. As the walk traverses the tree structure of the RPT for translation and a PTE is eventually found, a child TLB entry may be written to cache the PTE in the child TLB array 520b that also includes a backwards pointer to the parent TLB entry location. Furthermore, since the parent TLB entry is written at an intermediate step during translation, it can cache the next level of the RPT hierarchical tree by adding more child TLB entries during translation that point to the same parent TLB entry.

During translation, if an entry corresponding to the virtual address is not found in array 520a, a full RPT walk is performed and translation steps are cached in the TLB arrays. Hence, the RPT page walk steps cached in the TLB arrays allow the processing system to perform subsequent page walks faster since it does not have to perform the cached steps of the page walk, and/or the page walk does not need to start from the beginning.

FIG. 5C illustrates an overview of the TLB 520 and entries in the four TLB arrays cached during an HPT translation page walk. When the entries correspond to an HPT translation page walk, the four TLB arrays are configured as a parent TLB directory (520a), child TLB directory (520b), parent payload array (520c), and child payload array (520d). The TLB is configured such that there is a 1:1 mapping between parent TLB directory 520a entries and parent payload array 520c entries, and child TLB directory 520b entries and child payload array 520d entries. In certain embodiments, in HPT mode, the effective address space is 64 bits (0:63), the virtual address space is implemented as 68 bits (10:77) of the 78-bit architected maximum virtual address space, and the real address space is 62 (0:61).

In an embodiment, an entry 561a-n (or parent entry) in the parent TLB directory 520a includes a $PTE_S$ bit, virtual address bits (10:47), and LPID bits. The value of the $PTE_S$ bit is indicative of whether or not a child TLB entry exists corresponding to entry 561a-n in array 520b (i.e., the child TLB directory). For example, the parent TLB directory 520a may be configured such that if the value of the $PTE_S$ bit is 1, it is indicative that a child TLB entry does not exist corresponding to entry 561a-n in array 520b (or vice versa). In certain embodiments, the value of the $PTE_S$ bit is 1 if the page size is 1 GB and/or 16 GB, and the value of the $PTE_S$ bit is 0 if the page size is any size other than 1 GB or 16 GB. The virtual address bits (10:47) and the LPID bits are used to look up matching entries in the parent TLB directory 520a. The virtual address bits (10:47) are chosen to align in an exemplary embodiment to a 1 GB boundary. Other page boundaries are within the scope of this disclosure.

If a matching entry is not found in parent TLB directory 520a, then a TLB miss is registered and HPT page walk is performed (as discussed below). However, if a matching entry is found in parent TLB directory 520a, then the TLB search for the real address proceeds depending on the value of the $PTE_S$ bit in that entry.

If the value of the $PTE_S$ bit is 1 (i.e., no child TLB entry exists), the real address corresponding to the effective address is found in array 520c (the parent payload array). In such embodiments, entry 563a-n in the parent payload array 520c includes a real address when only a parent entry exists in the parent TLB directory 520a. In an embodiment, the real address in entry 563a includes 34 bits (0:33) for addressing a 16 GB page size broken into multiple 1 GB entries and/or a 1 GB page size. The real address bits are identified by first looking up the virtual address bits included in the parent entry from the parent TLB directory 520a and then finding the mapped entry in the parent payload array 520c. The parent payload array 520c entry may also include additional information, such as data access information. Examples of data access information include data access levels, such as limiting data access to read-only or allowing read operations and write operations, and subspace information, which defines programs that may access the real address included in entry 563a. Although some examples of additional information are provided by way of example, embodiments of the present disclosure encompass any additional information stored in an entry of a TLB array, where the additional information is not the virtual address or the real address.

If the value of the $PTE_S$ bit is 0 (i.e., a child TLB entry exists), TLB search continues to child TLB directory 520b. An entry 562a-n (or child entry) in the child TLB directory 520b may include lower order virtual address bits (depending on the page size), a parent TLB entry pointer, and a page size field. In an embodiment, the parent TLB entry pointer identifies the set and the row (or way) of the parent TLB directory 520a that includes the parent entry corresponding to entry 562. The number of lower order virtual address bits are selected based on the page size (for example, 48:51 for 16 MB page sizes, 48:59 for 64 KB page sizes, 48:63 for 4 KB page sizes, or the like), and may be used to look up matching entries in the child TLB directory 520b. Furthermore, the system uses the page size field to identify the page size of the corresponding entry in the child payload array 520d. During translation, if a match is found between the virtual address bits, then the page size is used to extract the appropriate real address bits from the child payload array 520d.

Entry 564 in the child payload array 520d includes the corresponding real address of the translation for the page table entries when a parent entry exists in the parent TLB array 520a and a corresponding child entry exists in the child TLB array 520b (i.e., the value of the $PTE_S$ bit in that parent entry indicates that a child TLB entry exists corresponding to that parent entry). In an embodiment, the real address in entry 564 includes the appropriate number of bits for addressing 16 MB (0:39), 64 KB (0:47), and/or 4 KB (0:51)

page sizes. The real address bits are identified by mapping the identified entry in the child TLB array 520*b* to an entry in the child payload array 520*d*. The entry in the child payload array 520*d* may also include additional information, such as data access information. Examples of data access information include data access levels, such as limiting data access to read-only or allowing read operations and write operations, and subspace information, which defines programs that may access the real address included in entry 563. Although some examples of additional information are provided by way of example, embodiments of the present disclosure encompass any additional information stored in an entry of a TLB array, where the additional information is not the virtual address or the real address.

In an embodiment, entries 561, 562, 563, and 564 are cached in the four TLB arrays 520*a*, 520*b*, 520*c*, and 520*d* during an HPT mode page walk as discussed below. An HPT mode page walk (shown in FIG. 2C) is initiated if a miss is registered in the parent TLB array 520*a*. As discussed above with respect to FIG. 2C, a hash value produced by hashing a portion of an effective address and a value of the VSID is performed to locate a page table entry (PTE) group in the HPT. Page table entries of the PTE group then are searched to locate a corresponding page table entry having a field matching a value of a most-significant-portion of the VSID. If a page table entry is found in the HPT, the address (e.g., real address) of the physical memory page in the PTE is used to access physical memory.

Once the translation is complete, bits (10:47) of the virtual address (including the VSID, page, and byte from the effective address) are cached in the parent TLB array 520*a* to form entry 561. Furthermore, the LPID of the instruction thread is added and a $PTE_S$ bit value is assigned to the entry 561. The $PTE_S$ bit value is assigned depending on the page size of the page table entry. If the page size of the page table entry is 16 GB, then the $PTE_S$ bit is assigned a value that indicates that the child entry is not relevant and/or does not exist because the lower order bits of the virtual address are not needed. Moreover, if the page size is 16 GB, bits (0:33) of the real address are cached in the parent payload array 520*c* to form entry 563.

However, if the page size of the page table entry is 16 MB, 64 KB, or 4 KB, then the $PTE_S$ bit is assigned a value that indicates that the child entry is needed to complete the virtual address for finding a matching entry for the real address. Furthermore, if the page size of the page table entry is 16 MB, 64 KB, or 4 KB, bits (48:66) of the virtual address are cached in the child TLB array along with a pointer to the parent entry (set, way) and the page size (16 MB, 64 KB, or 4 KB) to form entry 562. Finally, the appropriate number of bits of the real address (depending on the page size) are cached in the child payload array 520*d* to form entry 564. During translation, if a match is found between virtual address bits, then the page size is used to extract the appropriate real address bits from the child payload array 520*d*. It will be understood to those skilled in the art that that virtual address bits for indexing into the parent TLB directory 520*a* and the child TB directory 520*b* chosen based on the page size of an entry. As such, when searching the TLB the system identifies the page size and uses the appropriate number of bits of the virtual page number based on the page size and/or with different indexing methods for each page size. The corresponding tagging structure will always spread the tag across the TLB directory 520*a* and the child TB directory 520*b* in a manner that fits with the page size of the translation.

In an embodiment, an HPT mode page walk may also start if a match is found in the parent TLB array 520*a* and the $PTE_S$ bit value of the matching entry indicates that the child entry is relevant, but a miss is registered in the child TLB array 520*b*. This indicates that the upper order bits (10:47) of two virtual addresses are identical, but their lower order bits do not match. In this case, while the HPT page walk is started from the beginning, the matching entry in the parent TLB array 520*a* is remembered by the HPT page walker and if a page table entry is found during translation, a new child entry 562*a* is created in the child TLB array 520*b* to cache the appropriate number of bits (depending on the page size) of the virtual address with a pointer (set, way) to the remembered entry in the parent TLB array 520*a*. In other words, a new child entry is created corresponding to the already existing parent entry, and the parent entry does not need to be re-cached. Hence, an entry in the parent TLB array 520*a* may have one or more corresponding entries in the child TLB array 520*b*.

It will be understood to those skilled in the art that while entries corresponding to the RPT mode and the HPT mode are shown separately in FIGS. 5B and 5C respectively, they co-exist in the same TLB structure and TLB arrays. Furthermore, each array of the TLB 520 contains a plurality of entries and each of the above described possible entries may be present simultaneously in an array. Furthermore, while the above disclosure describes the TLB for caching entries corresponding to certain page sizes, the disclosure is not so limiting.

Figure 6:
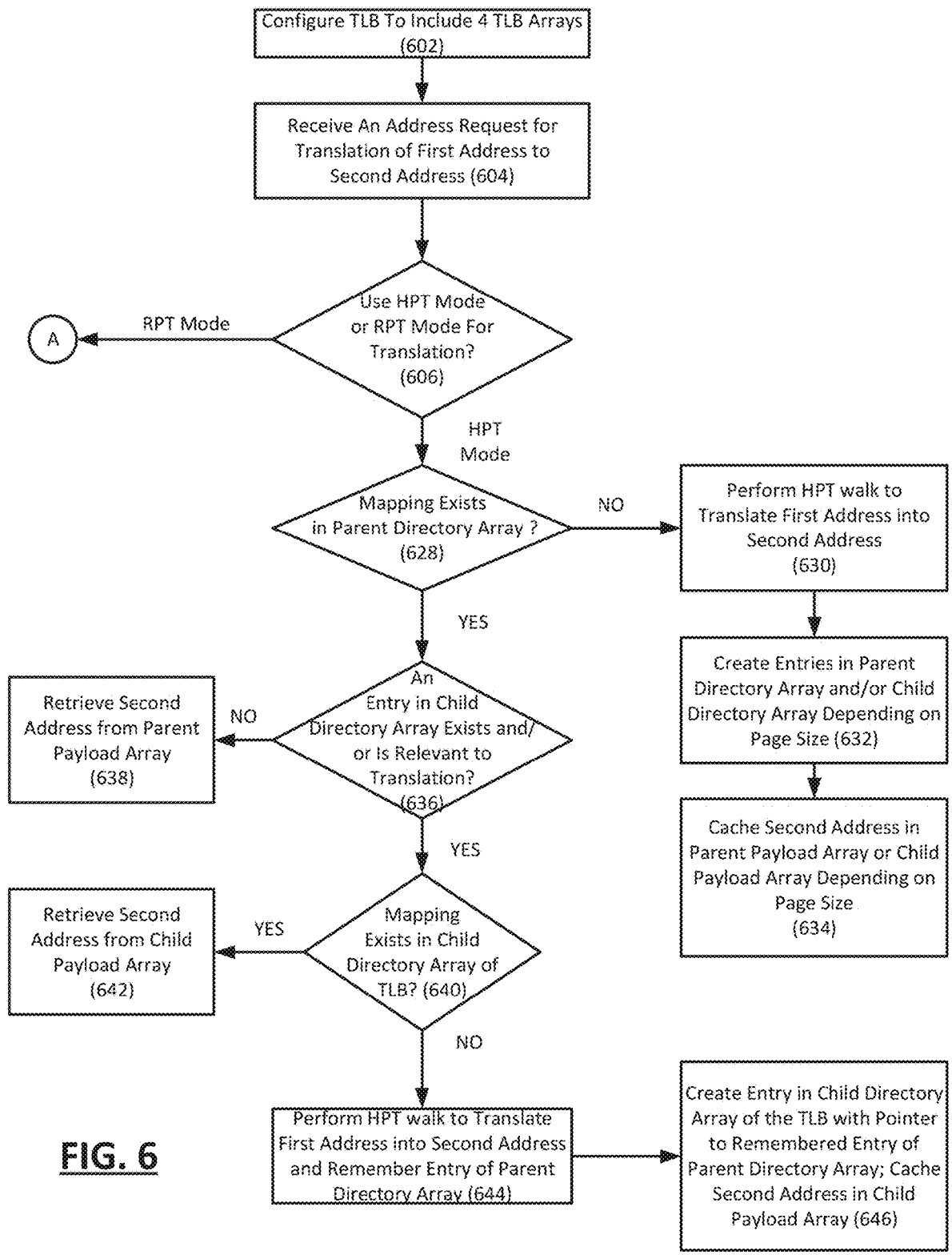
FIG. 6 is an exemplary flowchart illustrating and describing a method of performing parallel lookups for different page sizes according to embodiments of the present disclosure.

FIG. 6 an exemplary flowchart in accordance with various embodiments illustrating and describing a method of configuring and using a TLB including 4 TLB arrays as described in FIGS. 5A-5C. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6 but the process may be integrated and/or one or more steps may be performed together, simultaneously, or the steps may be performed in the order disclosed or in an alternate order.

At step 602, the system may configure a TLB including four different TLB arrays (or any other number) that are designed to operate in a hierarchical manner. During configuration, the TLB may be configured to cache page table entries and/or steps of the page walk hierarchy for an RPT mode translation. The TLB may also be configured to cache entries of an HPT mode translation as parent entries, child entries, parent payload and/or child payload.

At 604, the system may receive an address request that includes a first address (e.g., effective address or virtual address) that needs to be translated to a second address (e.g., physical or real address). This occurs, for example, when software that uses the processor (such as the kernel within an operating system) needs to perform some type of memory access operation. For example, an operating system may have a need to access a memory location that is associated with a virtual address.

At 606, the system may determine whether the translation of the effective address should be performed in HPT mode or in RPT mode for retrieving the second address. In an illustrative embodiment, the system may make the determination based on the value of the host radix (HR) bit in the Partition Table Control Register (PTCR). In these modes, the Partition Table Control Register (PTCR) contains the real address of the partition table base and the size of the table itself. In general, the partition table is indexed by the logical partition ID (LPID) value specified in the Logical Partition ID Register (LPIDR). When the partition-table entry is read, the HR bit determines which translation type is used by the hardware to translate the first address to the second address. For example, if the value of the HR bit=0, HPT translation is initiated, and if the value of the HR bit=1, RPT translation is initiated (or vice versa).

If the translation type is determined to be RPT, the system may determine whether a mapping exists for the received address in parent TLB array 520a by indexing into the TLB array 520a using an appropriate number of bits (e.g., 0:33) of the received first address (608). If a mapping exists, the system analyzes the value of the $PTE_S$ bit in the entry to determine whether the child TLB directory entry exists and/or is irrelevant (612). For example, the value of the $PTE_S$ bit=1 may indicate that child TLB directory entry does not exists and that the real address may be retrieved from the parent payload array for a 1 GB page size. The system may thus retrieve the real address (RA) from the parent payload array (616)

However, if the $PTE_S$ bit=0, the system may determine whether an entry mapping the lower order bits of the first address exists in the child directory array (618). If an entry does not exist (618: NO), the system retrieves an L3 PDE from the parent payload array and performs the RPT walk from level L4 (620). Similarly, if the mapping does not exist in the parent TLB array (608: NO), a miss is registered causing a full RPT page walk to be performed (610). In these circumstances, one or more steps of the RPT page walk may be cached in various TLB arrays (614), as discussed above. For example, an L2 PDE may be cached in the parent TLB directory array and a $PTE_S$ bit value may be assigned to it (e.g., 1 if page size is 1 GB). Furthermore, child entries may be created in the child TLB array with a backwards pointer to the parent TLB array entry. The final RA may be cached in the parent payload array (if page size=1 GB), or child payload array (for other page sizes). Alternatively, the L3 PDE may be cached in the parent payload array and/or L4 PDE may be cached in the child payload array, depending on the page size.

If a mapping exists in the child TLB directory (618: YES), the system analyzes the $PTE_{SC}$ value of the entry (622). The value of the $PTE_{SC}$ bit indicates whether the child payload entry is a page table entry or a real address. For example, if the value of the $PTE_{SC}$ bit=1, the system retrieves the RA from the child payload array (624). However, if the value of the $PTE_{SC}$ bit=0, the system retrieves the L4 PTE from the child payload array (626), and uses it to retrieve the RA. The system may then install the RA in the appropriate TLB array (i.e., child payload array).

In an embodiment, if one or more of the TLB arrays do not have sufficient space to store the steps of the page walk and/or the mapping from the first address to the second address, any now or hereafter known methods (such as least recently used (LRU) algorithm) may be used to replace one or more entries of the TLB arrays for caching the new entries.

If the translation mode is determined to be HPT at step 606, the appropriate number of upper order bits of the first address are used to determine if a mapping exists in the parent TLB directory 520a (628).

If a mapping does not exist, an HPT walk is commenced to translate the received first address into a second address (630). As discussed above with respect to FIG. 3, during an HPT walk, a primary hash is generated and the PTEG is searched for a matching translation. If the translation is successful and a second address is found in the HPT, an entry is created in the parent TLB directory 520a using upper order bits (10:47) of the received first address, as discussed above with respect to FIG. 5C (632). A $PTE_S$ bit is included in the parent TLB directory 520a entry to indicate whether the child TLB directory entry is relevant for translation based on the page size of the page table entry. For example, the $PTE_S$ bit may be assigned a value 1 for page sizes 1 GB and/or 16 GB to indicate that the child TLB entry is not relevant and/or does not exist. A child TLB entry may not be created for page sizes 1 GB and/or 16 GB.

For page sizes other than 1 GB and 16 GB, a child TLB entry may be created using the appropriate number of bits of the first address depending on the page size. Furthermore, a pointer (e.g., set/way) is added to the child TLB entry that corresponds to the parent TLB entry. Finally, the relevant page size of the page table entry is also added in the child TLB directory entry.

Next, the second address is cached either in the parent payload array 520c (for 1 GB or 16 GB page sizes) or the child payload array 520d for other page sizes (634).

However, if a mapping exists in step 628, the $PTE_S$ bit of the mapped entry is checked to determine whether an entry in the child TLB directory exists and/or is relevant for the translation (636). If a child entry does not exist and/or is not relevant, then the second address is retrieved from the parent payload array 520c (638) If a child entry exists, then an appropriate number of lower order bits of the received first address are used to determine if a mapping exists in the child TLB directory 520b (640). If a mapping exists, then the second address is retrieved from the child payload array 520d (642). However if a mapping does not exist in the child TLB directory 520b, an HPT walk is commenced to translate the received first address into a second address and the entry in the parent TLB directory 520a is remembered by the page walker (644). If the translation is successful and a second address is found in the HPT, the second address is cached in the child payload array 520d, as discussed above with respect to FIG. 5C (646). Furthermore, an entry is created in only the child TLB directory 520b using lower order bits of the received first address with a pointer to the remembered entry in the parent TLB directory 520a, as discussed above with respect to FIG. 5C (646).

In an embodiment, if one or more of the TLB arrays do not have sufficient space to store the steps of the page walk and/or the mapping from the first address to the second address, any now or hereafter known methods (such as least recently used (LRU) algorithm) may be used to replace one or more entries of the TLB arrays for caching the new entries.

While the illustrative embodiments described above are preferably implemented in hardware, such as in units and circuitry of a processor, various aspects of the illustrative embodiments may be implemented in software as well. For example, it will be understood that each block of the flowchart illustrations in FIG. 6, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Figure 7:
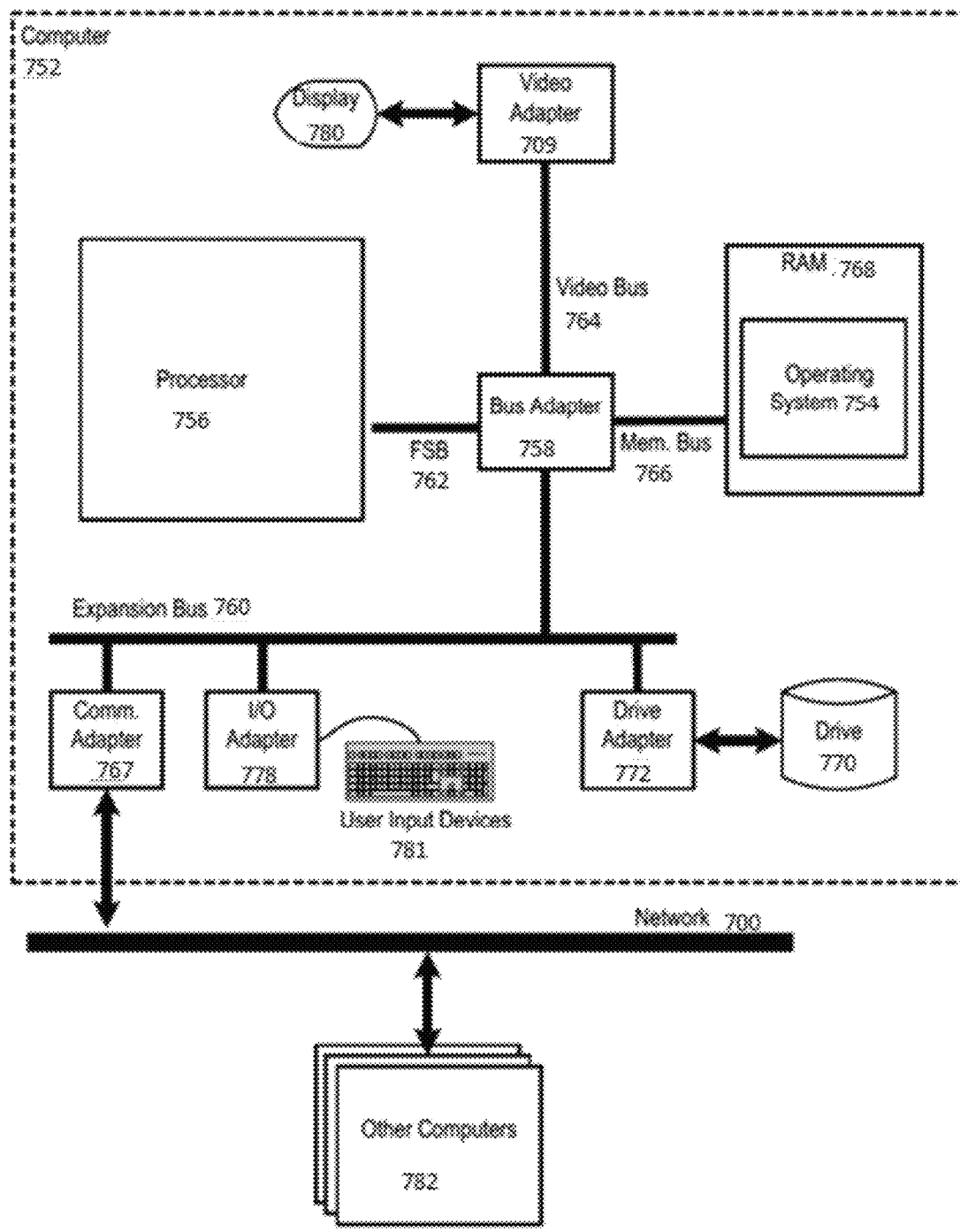
FIG. 7 is a functional block diagram illustrating a computer system, according to embodiments of the present disclosure.

FIG. 7 is a functional block diagram illustrating a computer system 70. The system 70 includes an example of automated computing machinery in the form of a computer 752.

The computer 752 may include at least one processor 756 or central processing unit ("CPU") as well as random access memory 768 ("RAM"), which is connected via a high speed memory bus 766 and bus adapter 758 to the processor 756 and to other components of the computer 752.

The processor 756 may be implemented as a multi-slice processor. The term"multi-slice" may refer to a processor having a plurality of similar or identical sets of components, in which each set of components may operate independently of all the other sets or in concert with the one or more of the other sets.

Although the processor 756 is shown to be coupled to RAM 768 through the front side bus 762, the bus adapter 758, and the high speed memory bus 766, those of ordinary skill in the art will recognize that such configuration is only an exemplary implementation and other configurations of coupling the processor 756 to other components of the system 70 may be utilized. For example, in some embodiments the processor 756 may include a memory controller configured for direct coupling to the memory bus 766. Yet, in other embodiments, the processor 756 may support direct peripheral connections, such as Peripheral Component Interconnect express ("PCIe") connections and the like.

An operating system 754 may be stored in RAM 768 of the computer 752. Operating systems, useful in computers configured for operation of a processor, may include UNIX™, Linux™, Microsoft Windows™, AIX™, IBM's z/OS™, and others known to those of ordinary skill in the art. In addition to the operating system 754 being located in RAM 768, other components of such as data processing applications may be stored in the RAM 768. Furthermore, software and other components may be stored in non-volatile memory, such as on a disk drive 770.

The computer 752 may include a disk drive adapter 772 coupled through an expansion bus 760 and bus adapter 758 to the processor 756 and other components of the computer 752. The disk drive adapter 772 may connect non-volatile data storage to the computer 752 in the form of the disk drive 770. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 752 may include one or more input/output ("I/O") adapters 778. I/O adapters 778 may implement user-oriented input/output through, for example, software drivers and computer hardware for controlling output to display devices, such as computer display screens, as well as user input from user input devices 781, such as a keyboard and mouse. The computer 752 may include a video adapter 709, which is an example of an I/O adapter specially designed for graphic output to a display device 780, such as a display screen or computer monitor. Video adapter 709 is connected to the processor 756 through the high speed video bus 764, bus adapter 758, and the front side bus 762, which may also be a high speed bus. I/O adapters 778 may also include COMM and Drive adapters. I/O adapters 778 may also be a PCI Express in which all I/Os are connected.

The computer 752 may include a communications adapter 767 for data communications with other computers 782 and for data communications with a data communications network 700. Such data communications may be carried out serially through RS-232 connections, through external buses such as a Universal Serial Bus ("USB"), through data communications networks such as IP data communications networks, and in other ways known to those of ordinary skill in the art. Communications adapter 767 may implement the hardware level of data communications through which one computer sends data communications to another computer, directly or through the data communications network 700. Examples of the communications adapter 767 may include modems for wired dial-up communications, Ethernet (IEEE 802.3) adapters for wired data communications, and 802.11 adapters for wireless data communications.

The arrangement of computers and other devices illustrated in FIG. 7 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 7.

Computing environments of different architectures may incorporate and use one or more aspects of the address translation capability provided herein. For instance, environments based on the PowerPC architecture, also referred to as Power ISA, offered by International Business Machines Corporation and described in the Power ISA™ Version 2.06 Revision B specification, Jul. 23, 2010, incorporated herein by reference in its entirety, may include one or more aspects, as well as computing environments of other architectures, such as the z/Architecture, offered by International Business Machines Corporation, and described in z/Architecture—Principles of Operation, Publication No. SA22-7932-08, 9th Edition, August 2010, which is hereby incorporated herein by reference in its entirety.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising, by a processing system: receiving a first address for translation to a second address;
   determining whether the translation should be performed using a hierarchical page table or a hashed page table;
   in response to determining that the translation should be performed using the hierarchical page table, determining, based on a third portion of the first address, whether a first translation lookaside buffer (TLB) array of a TLB data cache stores a mapping of the third portion of the first address, wherein the TLB data cache includes a hierarchical configuration comprising the first TLB array, a second TLB array, a third TLB array, and a fourth TLB array; and
   in response to determining that the first TLB array stores the mapping of the third portion of the first address, retrieving the second address from the third TLB array or the fourth TLB array.

2. The method of claim 1, further comprising in response to determining that the first TLB array does not store the mapping of the third portion of the first address:
   determining the second address by performing a hierarchical page table walk; and
   caching one or more steps of the hierarchical page table walk in one or more arrays of the TLB of the data cache.

3. The method of claim 1, further comprising retrieving the second address from the third TLB array if a page size of a page associated with the second address is 1 GB.

4. The method of claim 1, wherein retrieving the second address from the third TLB array or the fourth TLB array comprises:
   determining, based on a bit value of an entry in the stored mapping, whether an entry in the second TLB array is relevant to the translation; and
   in response to determining that the entry in the second TLB array is not relevant to the translation, retrieving the second address from the third TLB array.

5. The method of claim 4, further comprising in response to determining that the entry in the second TLB array is relevant to the translation:
   determining, based on a second portion of the first address, whether the secondTLB array stores a mapping of the second portion of the first address; and
   in response to determining that the second TLB array stores the mapping of the second portion of the second address, retrieving the second address from the fourth array.

6. The method of claim 4, further comprising, in response to determining that the first TLB array of the TLB data cache does not store a mapping of a first portion of the first address, determining the second address by performing a hashed page table page walk.

7. The method of claim 6, further comprising:
   caching the second address in one or more of the following: the third TLB array or the fourth TLB array;
   creating a first entry in the first TLB array, wherein the first entry comprises:
     the first portion of the first address,
     partition identifier (ID) bits corresponding to the first address, and
     a bit value indicating whether an entry in the second TLB array is relevant to translation of the first address to the second address, wherein the bit value in the first entry is chosen based on a page size of a page associated with the second address.

8. The method of claim 7, wherein the bit value in the first entry is assigned to indicate that entries in the second TLB array are not relevant to translation of the first address to the second address if a page size of a page associated with the second address is 16 GB.

9. The method of claim 7, wherein the bit value in the first entry is assigned to indicate an entry in the second TLB array is relevant to translation of the first address to the second address if a page size of a page associated with the second address is at least one of the following: 4 KB, 64 KB, or 16 MB.

10. The method of claim 9, further comprising, creating a second entry in the second TLB array, wherein the second entry comprises:
    a second portion of the first address;
    the page size of the page associated with the second address; and
    a pointer to the first entry in the first TLB array.

11. The method of claim 7, further comprising in response to determining that the second TLB array does not store a mapping of a second portion of the first address:
- determining the second address by performing the hashed page table page walk;
- caching the second address in one or more of the following: the third TLB array or the fourth TLB array; and
- creating an entry in the second TLB array, wherein the entry comprises:
  - the second portion of the first address,
  - the page size of the page associated with the second address, and
  - a pointer to an entry corresponding to the mapping of the first portion of the first address in the first TLB array.

12. A computing system comprising:
- a translation lookaside buffer (TLB), wherein the TLB comprises a first TLB array, a second TLB array, a third TLB array, and a fourth TLB array configured to operate in a hierarchical manner;
- a processor; and
- a non-transitory computer-readable storage medium comprising program instructions that when executed by the processor cause the processor to:
  - receive a first address for translation to a second address,
  - determine whether the translation should be performed using a hierarchical page table or a hashed page table,
  - in response to determining that the translation should be performed using the hierarchical page table, determining, based on a third portion of the first address, whether the first TLB array stores a mapping of the third portion of the first address; and
  - in response to determining that the first TLB array stores the mapping of the third portion of the first address, retrieving the second address from the third TLB array or the fourth TLB array.

13. The computing system of claim 12, further comprising programming instructions that when executed by the processor cause the processor to:
- in response to determining that the first TLB array does not store the mapping of the third portion of the first address:
  - determine the second address by performing a hierarchical page table walk; and
  - cache one or more steps of the hierarchical page table walk in one or more arrays of the TLB.

14. The computing system of claim 12, further comprising programming instructions that when executed by the processor cause the processor to:
- retrieve the second address from the third TLB array if a page size of a page associated with the second address is 1 GB.

15. The computing system of claim 12, further comprising programming instructions that when executed by the processor cause the processor to:
- in response to determining that the translation should be performed using the hashed page table, determine, based on a first portion of the first address, whether the first TLB array stores a mapping of the first portion of the first address, and
- in response to determining that the first TLB array stores the mapping of the first portion of the first address, retrieve the second address from the third TLB array or the fourth TLB array.

16. The computing system of claim 15, wherein the programming instructions that when executed cause the processor to retrieve the second address from the third TLB array or the fourth TLB array further comprise programming instructions that when executed by the processor cause the processor to:
- determine, based on a bit value of an entry in the stored mapping of the first portion of the first address, whether an entry in the second TLB array is relevant to the translation; and
- in response to determining that the entry in the second TLB array is not relevant to the translation, retrieve the second address from the third TLB array.

17. The computing system of claim 16, further comprising programming instructions that when executed by the processor cause the processor to, in response to determining that the entry in the second TLB array is relevant to the translation:
- determine, based on a second portion of the first address, whether the second TLB array stores a mapping of the second portion of the first address; and
- in response to determining that the second TLB array stores the mapping of the second portion of the second address, retrieve the second address from the fourth array.

18. The computing system of claim 15, further comprising programming instructions that when executed by the processor cause the processor to, in response to determining that the first TLB array of the TLB data cache does not store a mapping of the first portion of the first address, determine the second address by performing a hashed page table page walk.

19. The computing system of claim 18, further comprising programming instructions that when executed by the processor cause the processor to:
- cache the second address in one or more of the following: the third TLB array or the fourth TLB array;
- create a first entry in the first TLB array, wherein the first entry comprises:
  - the first portion of the first address,
  - partition identifier (ID) bits corresponding to the first address, and
  - a bit value indicating whether an entry in the second TLB array is relevant to translation of the first address to the second address, wherein the bit value is chosen based on a page size of a page associated with the second address.

* * * * *